United States Patent
Ando

(10) Patent No.: US 8,665,246 B2
(45) Date of Patent: Mar. 4, 2014

(54) POINTING DEVICE FOR IMPROVED ACCURACY

(75) Inventor: Hitoshi Ando, Saitama (JP)

(73) Assignee: Shin-Etsu Polymer Co., Ltd. (JP)

( * ) Notice: Subject to any disclaimer, the term of this patent is extended or adjusted under 35 U.S.C. 154(b) by 819 days.

(21) Appl. No.: 12/876,795

(22) Filed: Sep. 7, 2010

(65) Prior Publication Data

US 2011/0057876 A1  Mar. 10, 2011

(30) Foreign Application Priority Data

Sep. 10, 2009 (JP) .................................. 2009-208852

(51) Int. Cl.
*G06F 3/033* (2013.01)
*G09G 5/00* (2006.01)
*G06F 3/0354* (2013.01)

(52) U.S. Cl.
CPC .................................. *G06F 3/03548* (2013.01)
USPC ......................................................... 345/184

(58) Field of Classification Search
CPC .............................. G06F 3/033; G06F 3/03548
USPC ........................................... 345/156–167, 184
See application file for complete search history.

(56) References Cited

FOREIGN PATENT DOCUMENTS

| JP | 2003-150311 A | 5/2003 | |
|---|---|---|---|
| JP | 2003-177868 | 6/2003 | |
| JP | 2003177868 A | * 6/2003 | .............. G06F 3/033 |
| JP | 2004-171585 A | 6/2004 | |
| WO | WO 99/17180 | 4/1999 | |

\* cited by examiner

*Primary Examiner* — Ariel Balaoing
*Assistant Examiner* — Larry Sternbane
(74) *Attorney, Agent, or Firm* — Harness, Dickey & Pierce, P.L.C.

(57) ABSTRACT

A pointing device includes a first ground potential electrode; a second electrode for applying a voltage; a third electrode for measuring an electrical potential; a printed circuit board on which the first through the third electrodes are provided; a location pointing driving body that is provided on the printed circuit board and that is configured with a conductive part and that contacts the first and second electrodes, and a spherical part; a slide member that is located to cover a top part of the location pointing driving body and that is configured to drive the location pointing driving body by being slidable within a plane parallel to the printed circuit board; and a pressing force restriction member that is configured to restrict pressing force from the spherical part to the printed circuit board by receiving force from the slide member in the pressing direction.

7 Claims, 19 Drawing Sheets

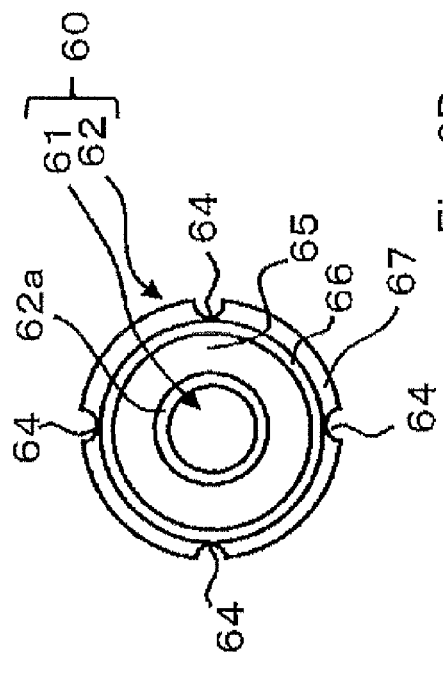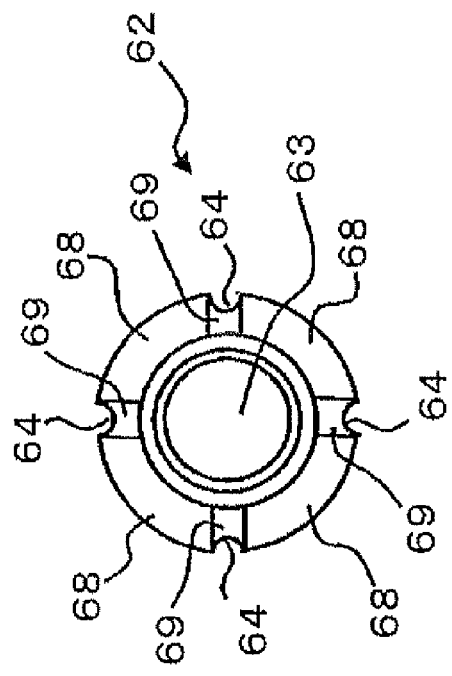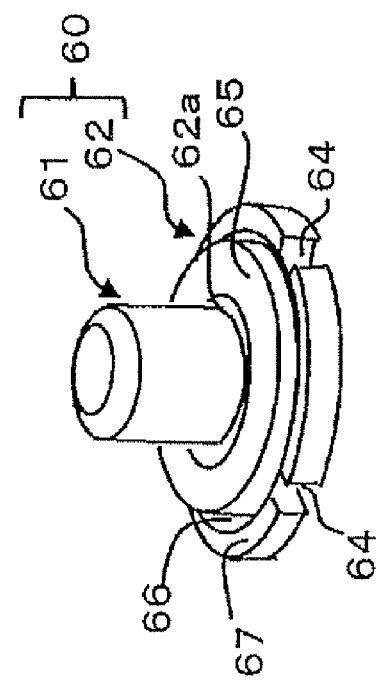

POINTING DEVICE FOR IMPROVED ACCURACY

CROSS REFERENCE

The present application is related to, claims priority from and incorporates by reference Japanese patent application number 2009-208852, filed on Sep. 10, 2009.

TECHNICAL FIELD

The present application relates to a pointing device that can point any direction on a plane, and that can be used as an operation device for an electronic device.

RELATED ART

Pointing devices have been widely used as an input device of, for example, personal computers, portable communication terminals, and game systems. Specifically, a pointing device in which a stick-shaped operating device is freely movable on at least an X-Y plane has been widely known as a very useful operating device to freely move an object displayed on a display. Such a pointing device has a wide variety of configurations. A pointing device in which a matrix (X, Y) of a pointing location is detected by contact locations in an X direction and a Y direction through contacting a nearly spherical part of a conductive elastic body to an electrode plane on a printed circuit board is known. For example, see international patent publication number WO 99/017180. A location detection mechanism of this pointing device is explained below with reference to the drawings.

FIG. 16 is a schematic sectional view of a conventional pointing device in which a conductive elastic body is used as an operating device. FIG. 17 is a top plan view of a printed circuit board (PCB) that is located as a lowermost layer of a conventional pointing device shown in FIG. 16.

A pointing device 200 has a configuration in which a rubber sensor 210 is fixed at a through hole 202 that is located at a center of a clamp ring 201, which is fixed on a PCB 220 and is in a nearly annular ring shape. Two cylindrical protrusion parts 203 and 204 are provided on the bottom surface of the clamp ring 201. Holes 221 and 222, in which the protrusion part 203 and 204 can be inserted, are formed in the PCB 220. The clamp ring 201 and the PCB 220 are fixed the each other by inserting the protrusion parts 203 and 204 in the holes 221 and 222. A fixing part 205 is located at a lower peripheral area of the through hole 202 of the clamp ring 201. The fixing part 205 functions to prevent the rubber sensor 210 from coming off from the through hole 202 by fixing an outer circumference part of the rubber sensor 210 to the fixing part 205. The rubber sensor 210 is configured with an operation part 211 that is made of insulating resin and a conductive elastic body 212 that is fixed to a lower part of the operation part 211. The conductive elastic body 212 is a molded body with great flexibility and has a larger diameter than that of the operation part 211. The conductive elastic body 212 has a spherical part 213 that is gently protruding toward the side of the PCB 220 and that is located just below the operation part 211. The conductive elastic body 212 also has a dome 214 that extends from the spherical part 213 to an outside in a diameter direction with a sigmoid shape (S-shaped curve) in up and down directions. A circumferential bottom surface 215 is formed at a bottom part of the dome 214 in the diameter direction. A joint part 216 that mates with the fixing part 205 is formed at a circumferential tip of the circumferential bottom surface 215.

As shown in FIG. 17, a plurality of electrodes is formed on an upper surface of the PCB 220 except in an area where the holes 221 and 222 exist. The plurality of electrodes is configured with a circular electrode 224 and four quadrangular electrodes 225-228 that are located outside the circular electrode 224 and that are arranged relative to each other at 90-degree intervals. These electrodes 224-228 are arranged without contacting each other. The four quadrangular electrodes 225-228 can switch between VCC and GND (ground potential). When VCC is applied to one electrode among two opposite electrodes across the circular electrode 224, GND is applied to the other one of the two opposite electrodes. The circular electrode 224 is connected to a device (not shown) that detects an electrical potential in order to detect a location of the spherical part 213 that contacts the circular electrode 224. The rubber sensor 210 is provided on the PCB 220 so that the circumferential bottom surface 215 of the rubber sensor 210 contacts the four quadrangular electrodes 225-228. When the rubber sensor 210 is out of operation, the spherical part 213 of the conductive elastic body 212 does not contact the circular electrode 224. When the operation part 211 is moved in any direction on a surface on the PCB 220 by pushing the operation part 211 downwardly, the spherical part 213 contacts the circular electrode 224. A contact region between the spherical part 213 and the circular electrode 224 varies depending on the degree of pushing and the driving direction of the operation part 211.

For example, as shown in FIG. 17, the spherical part 213 contacts the circular electrode 224 in a region A. In this case, a short circuit occurs at a location X1 on the left edge side of the region A between VCC that is applied to the quadrangular electrode 227 and GND that is applied to the quadrangular electrode 225, i.e., at a location on the X-axis that connects the quadrangular electrode 227, the circular electrode 224 and the quadrangular electrode 225. Similarly, s short circuit occurs at a location X2 in the right edge side of the region A between VCC that is applied to the quadrangular electrode 225 and GND that is applied to the quadrangular electrode 227. An electrical potential at a location where the short circuit occurs is proportional to the distance between the location where the short circuit occurs and either of the quadrangular electrodes 227 or 225. Therefore, the locations of X1 and X2 are determined by detecting the electrical potential of the locations where the short circuit occurs, respectively. Then, a point O, which is a middle point between the locations X1 and X2, is obtained. The point O becomes a pointing location (X-coordinate) on the X-axis of the pointing device 200. Likewise, a pointing location (Y-coordinate) on the Y-axis is determined by similarly detecting the electrical potential on the Y-axis that connects the quadrangular electrode 226, the circular electrode 224 and the quadrangular electrode 228. Coordinate (X, Y) as a pointing location on an X-Y plane is determined based on the X-coordinate and the Y-coordinate that are previously obtained.

Conventional art discussed above has the following problems. FIG. 18 is a sectional view for showing situations in which two types of operations are performed by tilting a conductive elastic body in one direction in a conventional pointing device shown in FIG. 16. In the case of tilting the operation part 211 of the rubber sensor 210 to the left side in the drawing as shown in FIG. 18, when the operation part 211 is largely tilted to the left side (211b) indicated by the arrow B, a pointing location should be more to the left side, as an intended effect, compared with the situation in which the operation part 211 is slightly tilted to the left side (211a) indicated by the arrow A. On the contrary, the following pointing errors may actually occur. When the operation part 211 is largely tilted to the left side indicated by the arrow B, the pointing location is closer to the center compared with the situation indicated by the arrow A. The above phenomenon is explained in detail with reference to FIG. 19. FIG. 19 is a schematic view for explaining a method for obtaining a coordinate of a pointing location according to each region in which a lower surface of a conductive elastic body contacts an electrode of a PCB at the time of performing the two kinds of operation shown in FIG. 18. As explained above with reference to FIG. 17, a pointing location of the pointing device 200 is determined by the region in which the spherical part 213 of the conductive elastic body 212 contacts the circular electrode 224. When the operation part 211 is slightly tilted to the left side indicated by the arrow A in FIG. 18, the spherical part 213 contacts the circular electrode 224 in the region A shown in FIG. 19. When the operation part 211 is tilted to the left side, the spherical part 213 is easily deformed in an oval shape as a contact region on the circular electrode 224 by receiving a downward force. The left edge location P (x1, 0) and the right edge location Q (x2, 0) of the region A are obtained by each electrical potential when VCC is applied to the quadrangular electrodes 227 and 225, respectively. As a result, when the operation part 211 is slightly tilted to the left side indicated by the arrow A, the middle location R ((x1+x2)/2, 0) between the locations P and Q is a pointing location on the X-axis.

On the other hand, when the operation part 211 is largely tilted to the left side indicated by the arrow B compared with the situation indicated by the arrow A in FIG. 18, the spherical part 213 contacts the circular electrode 224 in the region B shown in FIG. 19. In this case, the spherical part 213 is easily deformed in an oval shape as a contact region, the region B, on the circular electrode 224 in the same manner as the region A. The size of the region B is larger than that of the region A because the spherical part 213 is strongly pressed downwardly on the circular electrode 224. The left edge location S (x3, 0) and the right edge location T (x4, 0) of the region B are obtained by each electrical potential when VCC is applied to the quadrangular electrodes 227 and 225, respectively. As a result, when the operation part 211 is largely tilted to the left side indicated by the arrow B, the middle location U ((x3+x4)/2, 0) between the locations S and T is a pointing location on the X-axis. When the locations R and U shown in FIG. 19 are compared, the location U is on the right side. This situation, i.e. the location U on the right side compared with the location R on the circular electrode 224, means that when the operation part 211 is largely tilted to the left side, a pointing location is closer to the center. In other words, when the operation part 211 is largely tilted to the left side, a pointing location should be more on the left side as an intended effect; however, a converse phenomenon occurs. The above discussion relates to the X-axis. The same problems also occur on the Y-axis. In addition, when an operation of largely tilting the operation part 211 is performed, the spherical part 213 may contact outside of the detectable area on the circular electrode 224. Therefore, pointing errors easily occur at the time of detecting a pointing location.

SUMMARY

With consideration of the situation described above, the present application is provided. An object of the present application is to provide a pointing device in which pointing errors are lowered.

The inventor of the present application has examined causes for the pointing errors discussed above. As a result, the inventor identified the causes. The causes are that the amount of pressure in the vertical direction is larger at the time of strongly driving the sensor when a rubber sensor is driven within a level plane. When the amount of pressure in the vertical direction is large, a contact region with a circular electrode is extremely large and easily becomes oval shaped. Force for pressing the spherical part, which exists at a lower surface of the rubber sensor, toward the circular electrode is changed according to an operation direction and strength of the rubber sensor. Therefore, an area and a shape of the contact region between the spherical part and the circular electrode are changed. As a result, the possibility for the occurrence of errors, i.e. a detecting location is different from an intended driving direction of an operator, is increased. In view of this, the inventor determined that it is necessary to keep an almost constant contact region regardless of an operation direction when the rubber sensor is driven within a level plane. Specifically, the following solutions are employed.

One embodiment of a pointing device according to the present application is as follows: a pointing device comprises a first ground potential electrode; a second electrode for applying a voltage; a third electrode for measuring an electrical potential that is located between the first and second electrodes; a printed circuit board on which the first electrode, the second electrode and the third electrode are provided; a location pointing driving body that is provided on the printed circuit board and that is configured with a conductive part that is made of a conductive material and that contacts the first and second electrodes, and a spherical part protruding downwardly above the third electrode; a slide member that is located to cover a top part of the location pointing driving body and that is configured to drive the location pointing driving body by being slidable within a plane parallel to the printed circuit board; and a pressing force restriction member that is located outside the location pointing driving body and that is configured to restrict pressing force from the spherical part to the printed circuit board by receiving force from the slide member in the pressing direction after the spherical part of the location pointing driving body contacts the third electrode.

Another embodiment of a pointing device according to the present application is as follows: when the location pointing driving body is in a non-operation state, the spherical part is spaced apart from the third electrode, and a gap is defined between the slide member and the pressing force restriction member for applying the pressing force to the location pointing driving body until the spherical part contacts the third electrode.

Furthermore another embodiment of a pointing device according to the present application is as follows: the third electrode is a ring shape so that a hole is formed at the center of the third electrode.

Yet other embodiment of a pointing device according to the present application is as follows: the pointing device further comprises a fourth electrode for calibration that is spaced apart from the third electrode and within the hole.

Yet other embodiment of a pointing device according to the present application is as follows: the fourth electrode is a ring shape.

Yet other embodiment of a pointing device according to the present application is as follows: an inner bottom surface of a concave part that covers the top part of the location pointing driving body in the slide member from above has an outer circumferential concave part at an inner bottom corner that sags from the center of the inner bottom upper surface, and when the slide member is slid, the outer circumferential concave part is configured to enable the top part of the location pointing driving body to move smoothly.

According to the present application, pointing errors of a pointing device can be lowered.

BRIEF DESCRIPTION OF THE DRAWINGS

FIGS. 8A-8C are schematic views of a location pointing driving body shown in FIG. 1. Specifically, FIG. 8A is a perspective view; FIG. 8B is a top plan view; and FIG. 8C is a bottom plan view.

DETAILED DESCRIPTION

Hereinafter, exemplary embodiments of a pointing device according to the present application will be explained with reference to drawings.

1. First Embodiment

Figure 1:
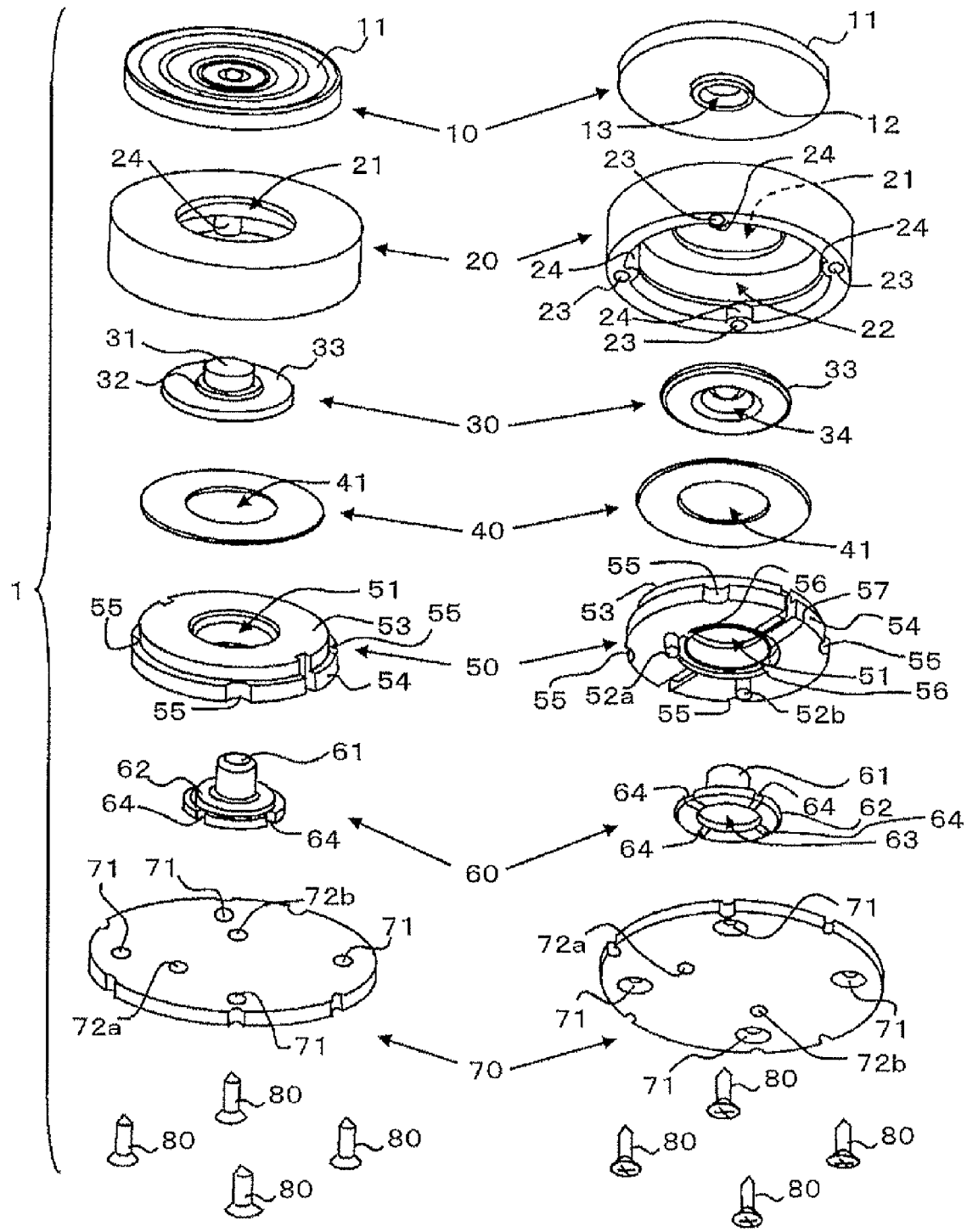
FIG. 1 is an exploded perspective view of a pointing device according to a first embodiment.
Figure 2:
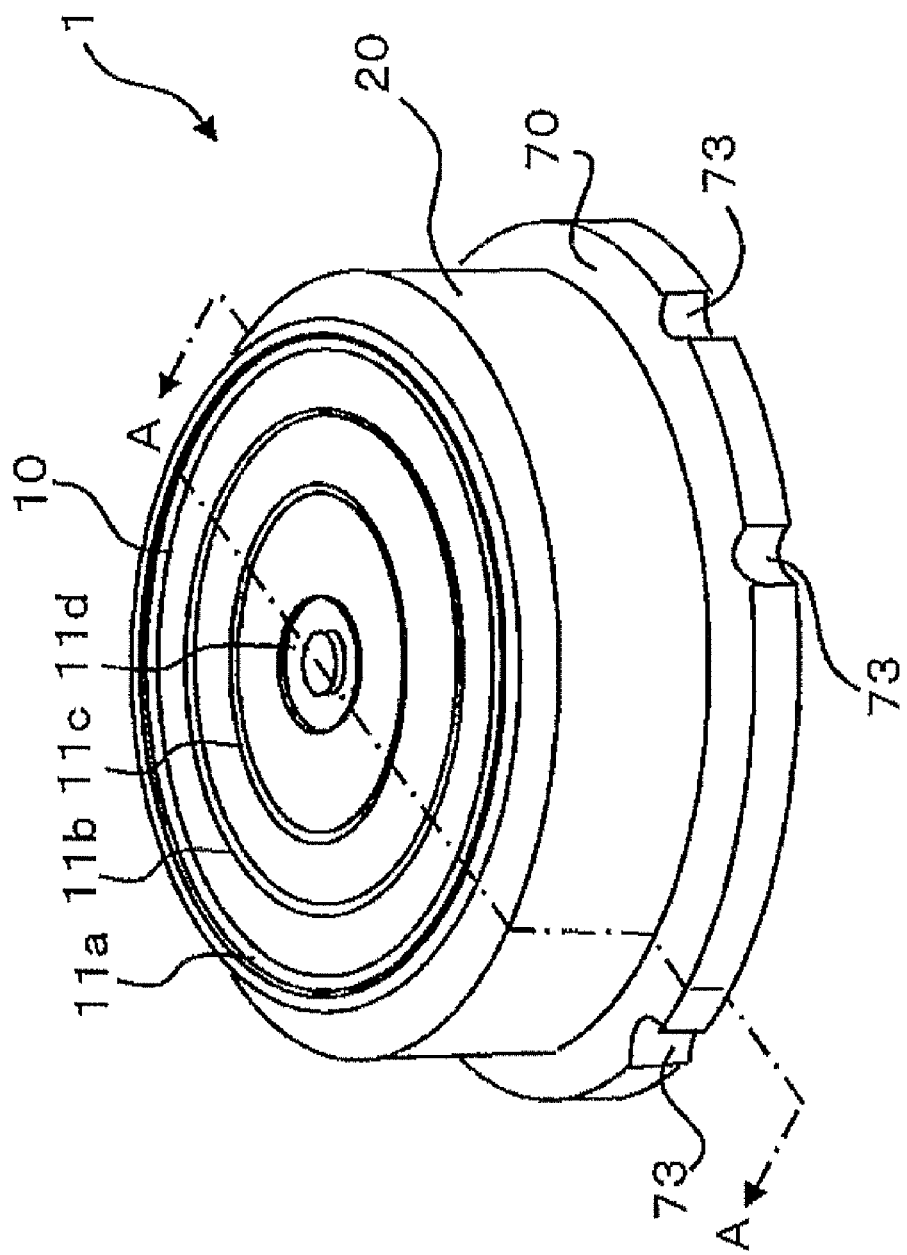
FIG. 2 is a perspective view of a pointing device shown in FIG. 1 after assembly.
Figure 3:
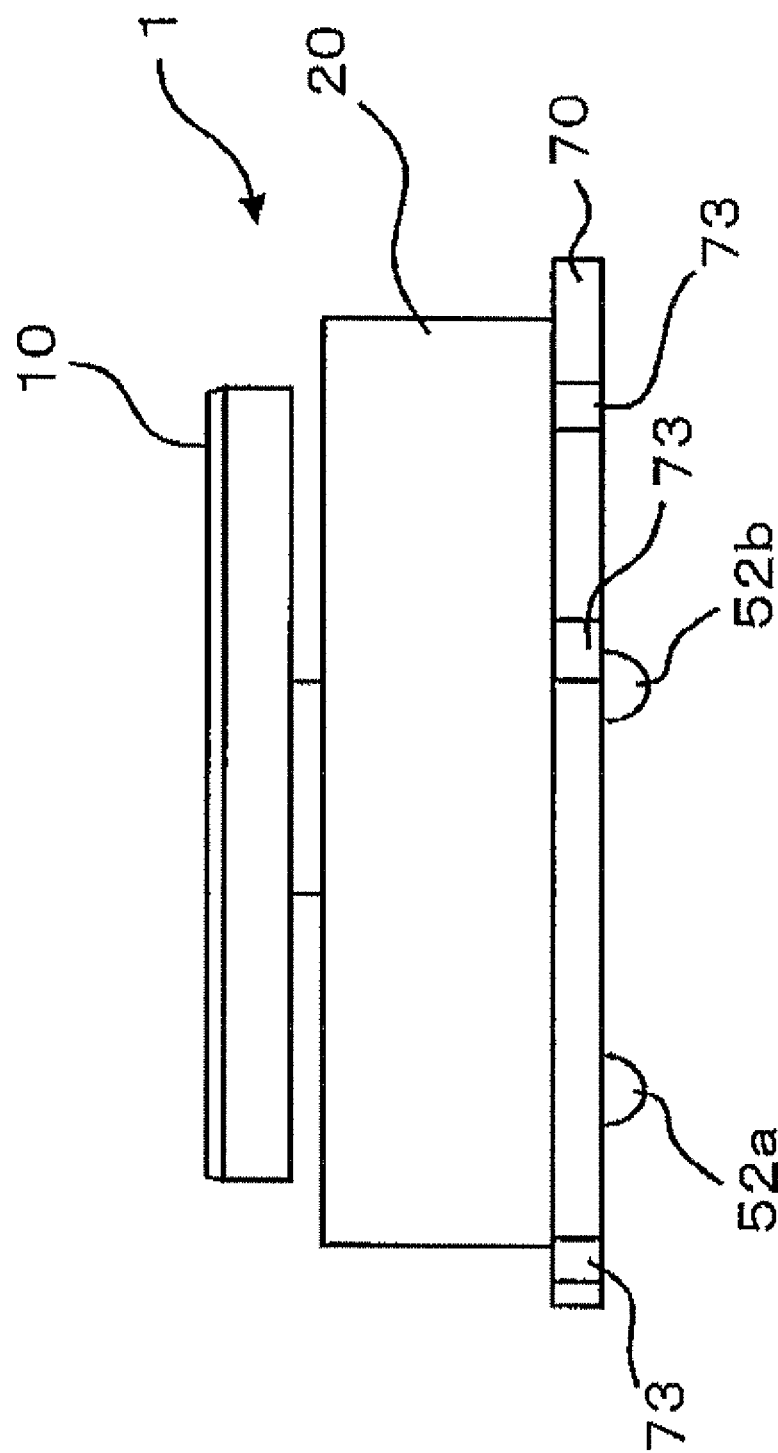
FIG. 3 is a side plan view of a pointing device shown in FIG. 1 after assembly.
Figure 4:
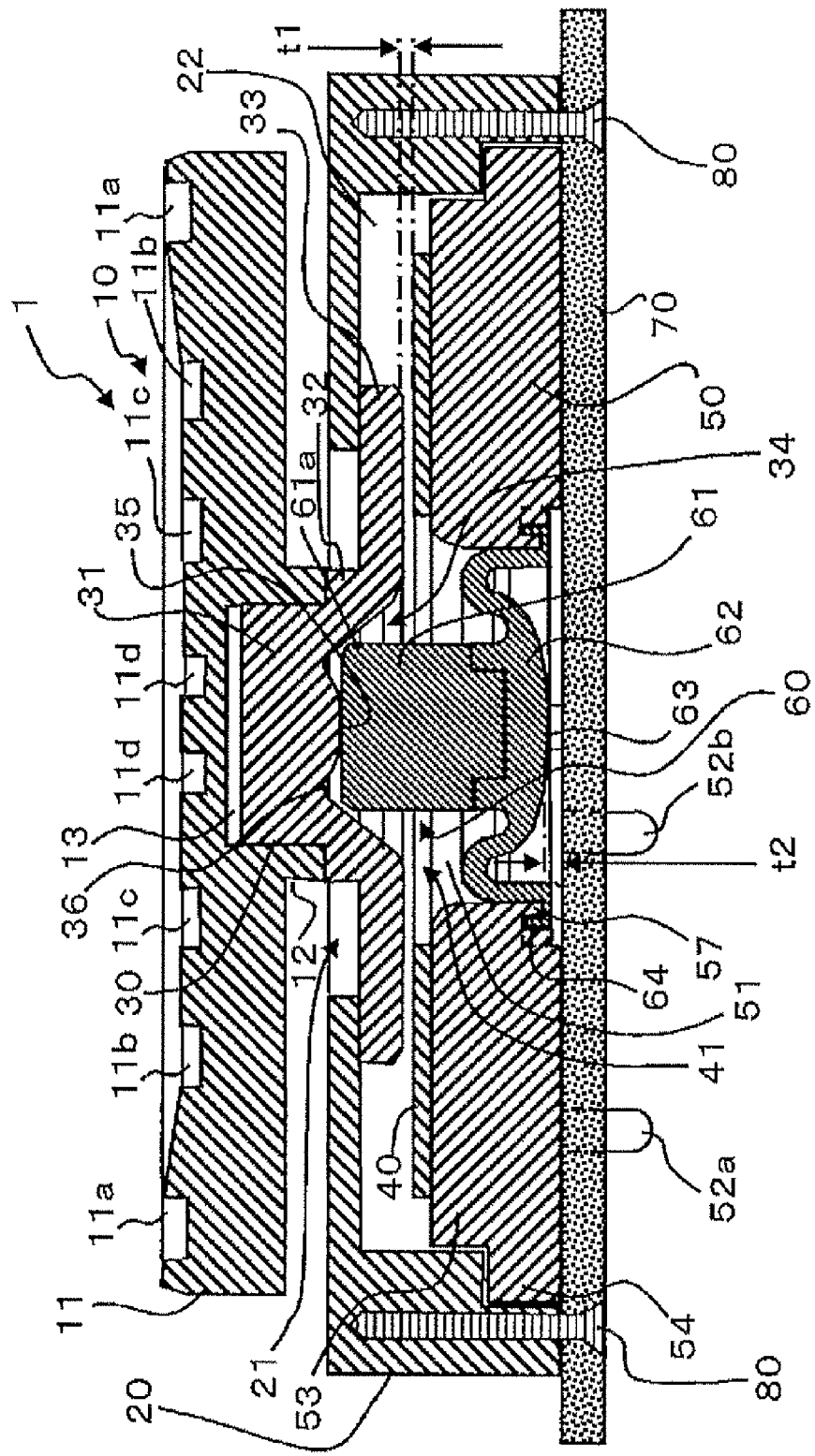
FIG. 4 is a sectional view of a pointing device taken along line A-A shown in FIG. 2.

FIG. 1 is an exploded perspective view of a pointing device according to a first embodiment. Left side configuration drawings are seen from an obliquely upward direction. Right side configuration drawings are seen from an obliquely downward direction. FIG. 2 and FIG. 3 are, respectively, a perspective view and a side plan view of a pointing device shown in FIG. 1 after assembly. FIG. 4 is a sectional view of a pointing device taken along line A-A shown in FIG. 2. Hereinafter, each direction for up, down, right, and left is defined as an up direction, a down direction, a right direction, and a left direction in FIG. 4, respectively.

As shown in FIG. 1, a pointing device 1 according to the first embodiment is configured with a combination of an actuator cap 10, a housing 20, a slide member 30, a ring sheet 40, a clamp ring 50, a location pointing driving body 60, and a PCB 70 in order from top to bottom.

The actuator cap 10 is made of resin and has a configuration in which a tube member 12 that has a sufficiently smaller diameter than that of an operation plate 11 is jointed at the center of a bottom surface of the operation plate 11 with a thin circular shape. A concave part 13 that has an opening on the lower side is formed inside of the tube member 12. As shown in FIG. 4, an upper surface of the operation plate 11 slightly sags downwardly in the center and has a plurality of grooves 11a, 11b, 11c and 11d in a concentric fashion from the outside to the center in the radial direction. These grooves 11a-11d function to prevent fingers from slipping at the time of operation and to enable fingers to be fitted thereon.

The housing 20 is made of resin and has a nearly cylindrical shape with the vertically thin thickness and a larger diameter than that of the operation plate 11. The housing 20 is jointed with the PCB 70 by facing its opening downwardly. A through hole 21 that has a larger diameter than that of the tube member 12 of the actuator cap 10 and a smaller diameter than that of the operation plate 11 is formed in the center of the upper surface of the housing 20. The through hole 21 connects to a space 22 inside of the housing 20. The space 22 has a larger diameter than that of the through hole 21 and has a nearly cylindrical shape. The diameter of the through hole 21 is increased (difference in level) in the middle in a direction from the through hole 21 through the opening part of the space 22. The slide member 30, the ring sheet 40, the clamp ring 50, and the location pointing driving body 60 are provided in the space 22. Four screw holes 23 are formed 90 degrees apart from each other in a circle that has the same center as the opening part on the peripheral edge surface in the opening side of the housing 20. The peripheral edge surface in which the screw holes 23 are formed is formed with thicker surface parts than others. The thicker surface parts protrude toward the center of the space 22 of the housing in the opening part. The thicker surface parts configure protrusion parts 24 with a semicircular column shape extending toward the upper part of the space 22 in a perpendicular direction with respect to the protruding direction up to the location of the difference in level as shown in FIGS. 1 and 4.

The slide member 30 is made of resin and has a downward opening part in a nearly hat shape. The slide member 30 is configured with a cylindrical part 31 in which the opening part side faces down, a thin ring part 32 with a larger diameter than that of the cylindrical part 31 attached to the opening part, and a thin ring part 33 with a larger diameter than that of the thin ring part 32 attached to the lower part of the thin ring part 32. The cylindrical part 31 has an outer diameter that is inserted to and is attachable to the concave part 13 of the tube member 12 of the actuator cap 10. It is preferred that the cylindrical part 31 and the tube member 12 are adhered by, for example, a bond or glue. An outer diameter of the ring part 32 is nearly the same as that of the tube member 12. An outer diameter of the ring part 33 is larger than the diameter of the through hole 21 of the housing. The outer diameter of the ring part 32 is smaller than the diameter of the through hole 21. Therefore, when the slide member 30 is assembled inside the space 22 of the housing 20, the ring part 33 of the slide member 30 contacts a back side of the upper surface of the housing 20 so that the slide member 30 cannot pass through the through hole 21 in the upper direction. A concave part 34 is formed at the inside of the slide member 30 sagging from the opening part at the lower part toward the back side of an upper surface of the cylindrical part 31. The detailed configuration of the concave part 34 is discussed later. The slide member 30 is provided to cover a top part of the location pointing driving body 60 from above and can drive the location pointing driving body 60 through operation by sliding within a surface parallel to a plane of the PCB 70.

It is preferred that the ring sheet 40 is a thin sheet in a ring shape and is made of fluorine system resin, such as polytetrafluoroethylene (PTFE). A circular through hole 41 is formed at the center of the ring sheet 40. An outer diameter of the ring sheet 40 is smaller than a diameter of the upper part of the space 22 inside the housing 20 (just below the through hole 21) and is larger than that of the ring part 33 of the slide member 30. A diameter of the through hole 41 is smaller than the outer diameter of the ring part 33 of the slide member 30 and is also smaller than that of the through hole 21 of the housing 20. When the ring sheet 40 is assembled inside the space 22 of the housing 20, the slide member 30 cannot pass through the through hole 41 of the ring sheet 40 in the lower direction.

The clamp ring 50 is made of resin and has a thin nearly annular ring shape. A through hole 51 that passes through the clamp ring 50 in upper and lower directions is formed at the center of the clamp ring 50. The through hole 51 has a difference in level with a larger diameter close to a lower surface of the clamp ring 50. Two fixing members 52a and 52b that protrude downwardly are formed outside of the through hole 51 at the lower surface of the clamp ring 50. The clamp ring 50 is configured by vertically adhering a ring part 53 and a ring part 54 that has a larger diameter than that of the ring part 53. An outer diameter of the upper ring part 53 is larger than that of the ring sheet 40 and is slightly smaller than an inner diameter at the upper part of the space 22 of the housing 20. An outer diameter of the lower ring part 54 is slightly smaller than an inner diameter at the lower part of the space 22 of the housing 20 and is larger than the inner diameter at the upper part of the space 22 of the housing 20. Four concave parts 55 with a semicircular shape that are slightly sagged inside are arranged 90 degrees apart from each other in a circle that has the same center as the through hole 51 at an outside surface of the ring part 54. The concave parts 55 are provided in a location with a shape suitable for fitting to the protrusion parts 24 of the housing 20. Therefore, the concave parts 55 can be inserted inside the space 22 of the housing 20 in accordance with the protrusion parts 24 of the housing 20 until the ring part 54 abuts the difference in level inside the space 22. It is preferred that the ring sheet 40 is adhered to the upper surface of the ring part 53 of the clamp ring 50 by, for example, a bond or glue. An inner diameter of the through hole 51 of the clamp ring 50 is smaller than that of the through hole 41 of the ring sheet 40. Two protrusion parts 56 with a semicircular column shape protruding toward the center of the lower opening part of the through hole 51 and extending from the lower opening part until the location of the difference in level are formed. The two protrusion parts 56 are arranged 180 degrees apart from each other in a circle that has the same center as at the lower opening part of the through hole 51.

The location pointing driving body 60 has a nearly hat shape and is configured by connecting an operation part 61 that is made of resin and has a nearly cylindrical shape with a conductive elastic body 62 with a thin nearly dome shape. The conductive elastic body 62 is made by mixing and kneading conductive filler and materials of insulating rubber elastic body. It is preferred that a conductive material in, for example, a particle state, a fibrous state, or a plate is used as the conductive filler; and a conductive material, such as carbon or metal, can be used as the material. Especially, particle carbon (carbon black) can preferably be used. It is preferred that a material, such as thermoplastic elastomer, thermoset elastomer, natural rubber, can be used as the rubber elastic body. Especially, silicone rubber can preferably be used. The conductive material is preferably contained in the conductive elastic body 62 with 5-50% by weight (wt %), and more preferably 15-35 wt %.

An outer diameter of the operation part 61 of the location pointing driving body 60 is sufficiently smaller than a diameter of the through hole 51 of the clamp ring 50. There are enough clearance gaps between the operation part 61 and the through hole 51 so as to enable the operation part 51 to freely move within a level plane. The conductive elastic body 62 has a difference in level, i.e. a sigmoid shape (S-shaped curve) in up and down directions, that is vertically waved and toward an inside of a lower layer part in the radial direction as shown in FIG. 4. The vertical thickness of the lower layer part is substantially the same as the length from the lower opening surface of the through hole 51 of the clamp ring 50 through the location in which the difference in level of the through hole 51 exists. The conductive elastic body 62 has a spherical part 63 at its lower center. The spherical part 63 gently forms into a downward arch as a slightly upper location over the lower opening of the location pointing driving body 60 is the lowermost surface. An outer diameter of the conductive elastic body 62 is slightly smaller than an inner diameter of the lower opening part of the through hole 51 of the clamp ring 50 and is larger than an inner diameter of the through hole 51 that is above the difference in level. Four concave parts 64 with a semicircular shape that are slightly sagged inside are arranged 90 degrees apart from each other in a circle that has the same center as the spherical part 63 at an outside surface of the conductive elastic body 62. Two concave parts 64 that are located 180 degrees opposite each other out of the four concave parts 64 are provided in a location with a shape suitable for fitting to the two protrusion parts 56 of the clamp ring 50. When the location pointing driving body 60 is inserted from the lower part of the clamp ring 50 toward the through hole 51, the two opposite concave parts 64 are fitted with the corresponding two protrusion parts 56, and the conductive elastic body 63 abuts the difference in level inside the through hole 51 of the clamp ring 50. In this state, the operation part 61 goes through the through hole 51 of the clamp ring 50 and the through hole 41 of the ring sheet 40 so that the operation part 61 contacts a back surface of the cylindrical part 31 of the slide member 30. Alternatively, the operation part 61 has a small clearance gap toward the back surface. The lower surface of the location pointing driving body 60 is substantially the same level with the lower surface of the clamp ring 50. The detailed configuration of the location pointing driving body 60 is discussed later.

The PCB 70 is a circuit board with a thin nearly circular shape that is made of, for example, resin with high insulating performance or a composite of the resin and glass. An outer diameter of the PCB 70 is larger than that of the housing 20. A plurality of electrodes (not shown in FIGS. 1-4) that are discussed later are formed at a nearly center region of the upper surface of the PCB 70. Four screw holes 71 are arranged 90 degrees apart from each other in a circle that has the same center as the nearly center part of the PCB 70 at a location close to an outer circumference of the PCB 70. The screw holes 71 go through the PCB 70 in the thickness direction and are fitted with the locations of the screw holes 23 of the housing 20. The PCB 70 and the housing 20 are joined together by screwing four screws 80 from the back side of the PCB 70 through the screw holes 71 and the screw holes 23 of the housing 20. Two through holes 72a and 72b are formed at the outside of regions in which electrodes exist and at the inside of the screw holes 71 in the PCB 70. The through holes 72a and 72b are provided in a location with a shape suitable for fitting to the fixing members 52a and 52b of the clamp ring 50, respectively. The thickness of the PCB 70 is thinner than the length of the fixing members 52a and 52b. Therefore, when the PCB 70 is fixed to the lower surface of the clamp ring 50, the fixing members 52a and 52b protrude below the PCB 70 as shown in FIGS. 3 and 4. Six concave parts 73 that are sagged inside of the PCB 70 are formed at the outside surface of the PCB 70 and prevent the PCB 70 from rotating by fixing the PCB 70 with screws.

When the above mentioned parts, the actuator cap 10, the housing 20, the slide member 30, the ring sheet 40, the clamp ring 50, the location pointing driving body 60, and the PCB 70, are assembled in order, the concave parts 55 of the clamp ring 50 are fitted with the concave parts 24 of the housing 20. Similarly, the concave parts 64 of the location pointing driving body 60 are fitted with the concave parts 56 of the clamp ring 50; and the fixing member 52a and 52b of the clamp ring 50 are inserted into the through holes 72a and 72b of the PCB 70, respectively. As a result, when the actuator cap 10 is freely operated within a plane parallel to the PCB 70, the housing 20, the clamp ring 50 and the location pointing driving body 60 do not rotate with respect to the PCB 70 so that the slide member 30 is driven in accordance with movement of the actuator cap 10. The concave part 34 in the back side of the slide member 30 covers the top part of the operation part 61. Therefore, when the slide member 30 is driven, the operation part 61 is also driven. Because the conductive elastic body 62 that is connected to the lower part of the operation part 61 can be flexibly deformed, the spherical part 63 that is located at the lower part of the operation part 61 is freely moved at the time of driving while contacting an electrode 75 for measuring an electrical potential (alternatively, electrodes 74 and 75 for measuring an electrical potential) that is discussed later. This situation is discussed later.

Next, an internal structure of the pointing device 1 is discussed in detail with reference to FIG. 4.

As shown in FIG. 4, when the actuator cap 10 is not operated, there is a gap t1 (for example, t1=0.2 mm) between the lower surface of the ring part 33 of the slide member 30 and the upper surface of the ring sheet 40. In the same situation discussed above, there is a gap t2 (for example, t2=0.2 mm) between the PCB 70 (specifically, a plurality of electrode surfaces that are formed on the upper surface of the PCB 70) and the spherical part 63 that is located at the lower part of the location pointing driving body 60. It is ideal that the gap t1 is equal to the gap t2 (t1=t2). However, the gap t1 can be larger than the gap t2, such as t1=0.18 mm and t2=0.15 mm (t1>t2). In contrast, it is not preferred that the gap t1 is smaller than the gap t2 (t1<t2). In this case, when the actuator cap 10 is pressed downwardly, before the spherical part 63 contacts the electrode on the PCB 70, the lower surface of the ring part 33 of the slide member 30 contacts the upper surface of the ring sheet 40. However, when the following conditions are realized, the above relationship, the gap t1 is smaller than the gap t2, may be used. The conditions are: (1) the ring sheet 40 or the clamp ring 50 is made of a flexible material; (2) after the gap t1 is equal to "0," the gap t2 can be equal to "0" by slightly pressing the location pointing driving body 60 downwardly; and (3) the spherical part 63 can be pressed against the electrode on the PCB 70.

The outer diameter of the ring part 32 of the slide member 30 is sufficiently smaller than the diameter of the upper opening part of the through hole 21 of the housing 20. The outer diameter of the ring part 33 of the slide member 30 is sufficiently smaller than the diameter of the upper part of the space 22 of the housing 20. Further, the outer diameter of the operation part 61 of the location pointing driving body 60 is sufficiently smaller than the diameter of the through hole 51 of the clamp ring 50. As a result, when the actuator cap 10 is operated, the slide member 30 can be freely slid within a plane parallel to the plane of the PCB 70 until the ring part 32 contacts the internal surface of the opening of the through hole 21, or until the ring part 33 contacts the internal surface at the upper part of the space 22.

The width of the concave part 34 inside of the slide member 30 is narrower in the order from the lower opening surface toward the upper part. The upper surface of the concave part 34 has a convex part 35 protruding from a certain region of the center of the upper surface downwardly and has an outer circumferential concave part 36 slightly sagging upwardly from the outer circumference of the convex part 35. It is preferred that the nearly center part of the upper surface of the operation part 61 contacts the convex part 35 or is extremely close to the convex part 35. It is also preferred that a corner part 61a of the top part of the operation part 61 contacts the side surface of the concave part 34 or is extremely close to the side surface of the concave part 34.

Since there is the gap t2 between the spherical part 63 and the electrode surface of the PCB 70, after the spherical part 63 contacts the electrode on the PCB 70 by pressing the actuator cap 10 downwardly, an operator points a desired location by freely driving the actuator cap 10 within the plane parallel to the plane of the PCB 70. The reason why the gap t2 is provided is to prevent electrical power from being consumed caused by the situation in which the spherical part 63, a part of the conductive elastic body 62, always contacts the electrode.

Figure 5A:
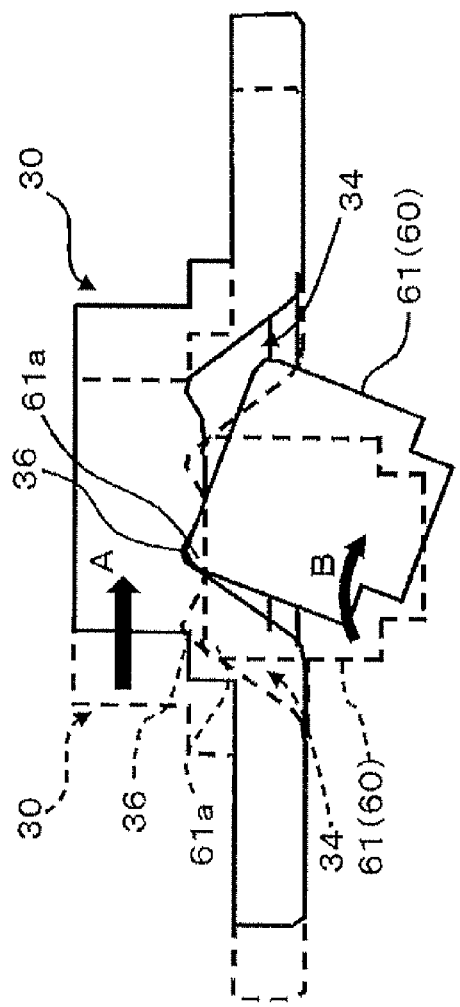
FIGS. 5A and 5B are schematic views for explaining movement of an operation part of a location pointing driving body when a slide member shown in FIG. 4 performs a sliding operation from right to left (side to side) in FIG. 4.
Figure 5B:
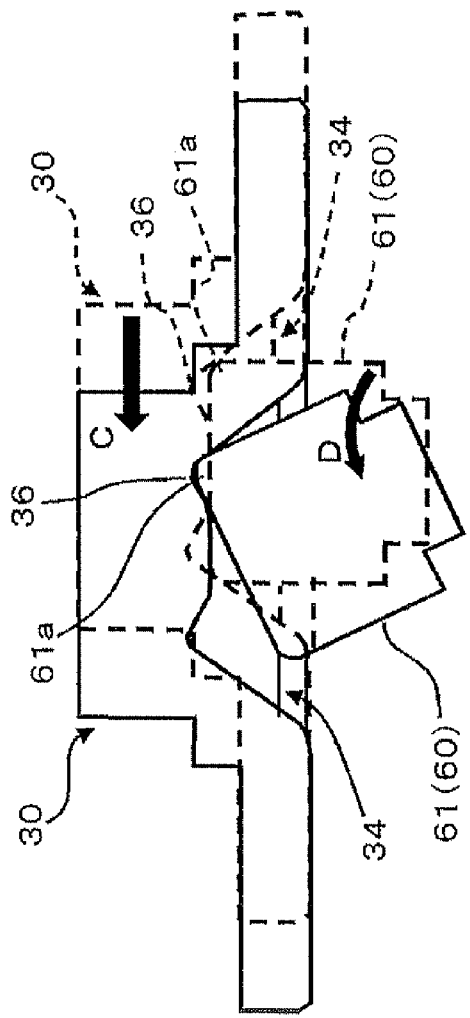

FIGS. 5A and 5B are schematic views for explaining movement of an operation part of a location pointing driving body when a slide member shown in FIG. 4 performs a sliding operation from right to left (side to side) in FIG. 4.

As shown in FIG. 5A, when the slide member 30 is slid to the right (direction indicated by arrow A), the top part of the operation part 61 of the location pointing driving body 60 is tilted to the right indicated by arrow B by the side surface of the concave part 34 that is open below the slide member 30. The left side of the corner part 61a of the tilted top part is moved to an upper location (location shown in a solid line) by turning from an original position (location shown in a dotted line). The outer circumferential concave part 36 located in the upper surface and outer circumference of the concave part 34 of the slide member 30 functions not to prevent the left side of the corner part 61a from moving to the upper part. Similarly, as shown in FIG. 5B, when the slide member 30 is slid to the left (direction indicated by arrow C), the top part of the operation part 61 of the location pointing driving body 60 is tilted to the left indicated by arrow D by the side surface of the concave part 34 of the slide member 30. The right side of the corner part 61a of the tilted top part is moved to an upper location (location shown in a solid line) by turning from an original position (location shown in a dotted line). The outer circumferential concave part 36 functions not to prevent the right side of the corner part 61a from moving to the upper part. The movement examples discussed above are for the case in which the slide member 30 is moved to the right and left. However, in an actual case, the slide member 30 can freely be moved within a plane parallel to a plane of the PCB 70. In this case, the corner part 61a of the top part of the operation part 61 can be moved to the upper part by any locations of the upper surface and outer circumference of the concave part 34 of the slide member 30. The corner part 61a can be moved upwardly without restriction by the upper surface and the side surface of the concave part 34 of the slide member 30 because of the existence of the outer circumferential concave part 36.

Figures 6A, 6B:
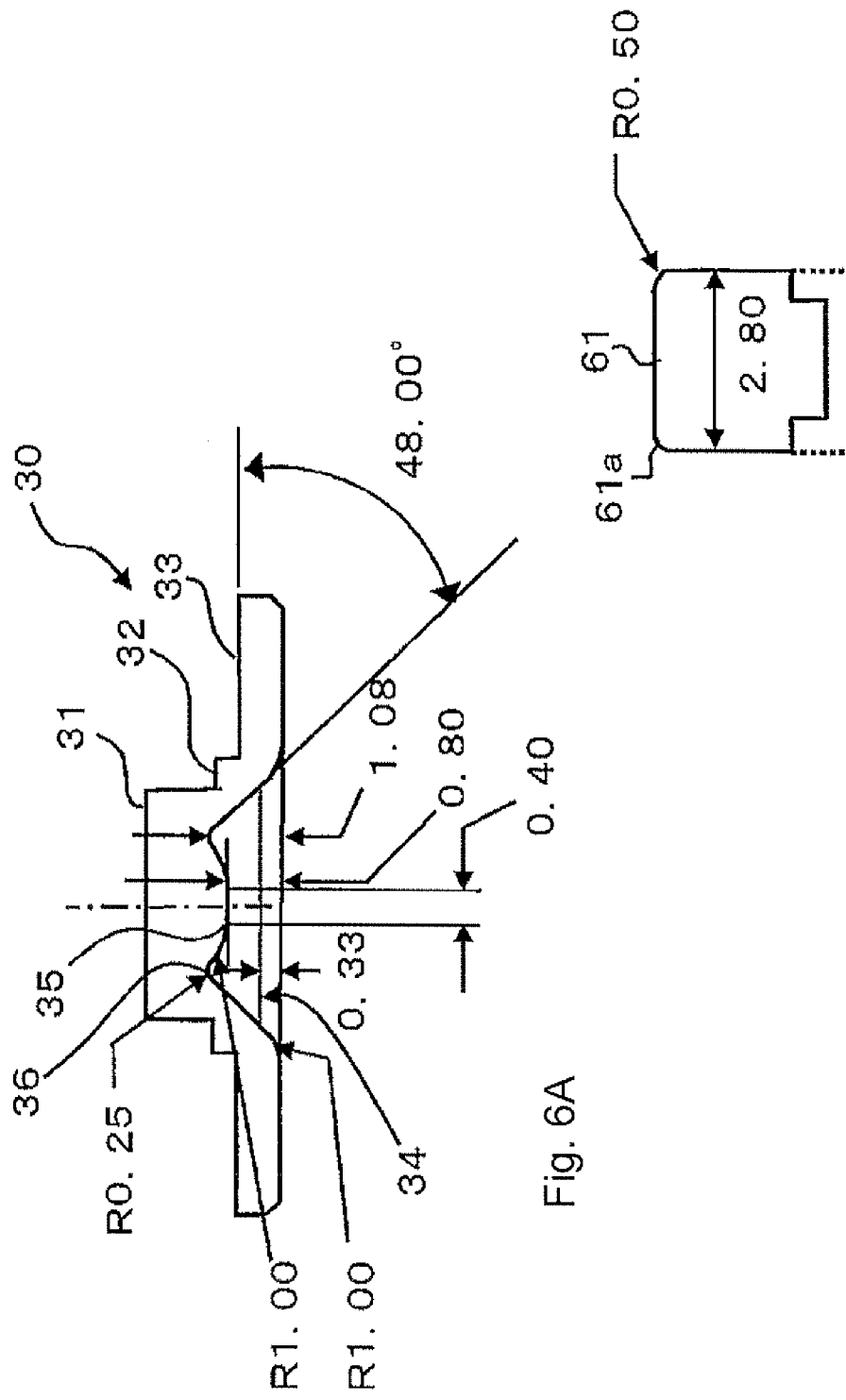
FIGS. 6A and 6B are schematic views of each preferred configuration of a slide member and a location pointing driving body shown in FIGS. 5A and 5B.

FIGS. 6A and 6B are schematic views of each preferred configuration of a slide member and a location pointing driving body shown in FIGS. 5A and 5B.

The slide member 30 is explained below with reference to FIG. 6A. The concave part 34 of the slide member 30 slants obliquely upwardly toward the inside of the concave part 34 in the radial direction from a chamfer part that forms into a downward arch with the radius of 1.00 mm (R1.00 mm) at the lower surface of the ring part 33. A vertical length of the chamfer part is approximately 0.33 mm. An angle between the upper surface of the ring part 33 and the sloped surface that slants obliquely upwardly of the concave part 34 is approximately 48 degrees. The lowermost surface of the convex part 35 that is in the nearly center of the upper surface of the concave part 34 is a circular level surface with the radius of approximately 0.4 mm. The distance between the lowermost surface and the opening part of the concave part 34 is approximately 0.8 mm. The distance between the deepest part of the outer circumferential concave part 36 at the upper surface of the concave part 34 and the opening part of the concave part 34 is approximately 1.08 mm. The deepest part of the outer circumferential concave part 36 is formed with the radius of 0.25 mm (R0.25 mm) to form into an upward arch without an edge (edge free). A surface forming into an arch that extends between the deepest part of the outer circumferential concave part 36 and the convex part 35 gently forms into a downward arch with a radius of 1.00 mm (R1.00 mm). Next, the operation part 61 of the location pointing driving body 60 is explained below with reference to FIG. 6B. The outer diameter of the top part of the operation part 61 of the location pointing driving body 60 is approximately 2.80 mm. The corner part 61a at the upper surface of the top part is chamfered by the radius of 0.50 mm (R0.50 mm). These structures of the concave part 34 and the operation part 61 discussed above are preferred examples that enable the operation part 61 to smoothly move within the concave part 34. However, each structure of the concave part 34 and the operation part 61 is not limited to the above structures.

Figure 7:
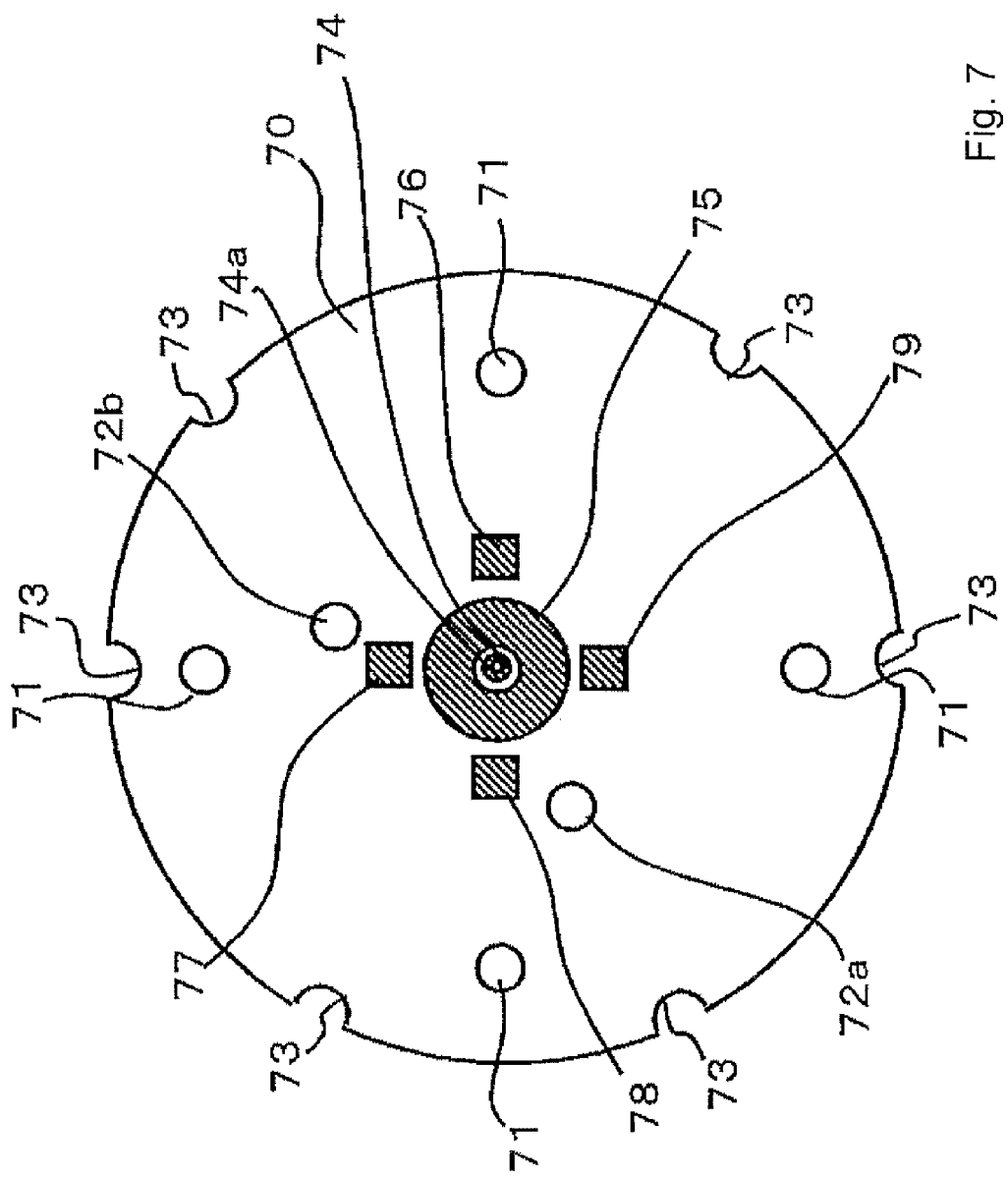
FIG. 7 is a top plan view of a PCB shown in FIG. 1.

FIG. 7 is a top plan view of the PCB 70 shown in FIG. 1.

In the nearly center portion of the PCB 70, the following electrodes are formed: a ring-shaped electrode 74 and having a hole 74a at the center; a ring-shaped electrode 75 (electrode for measuring an electrical potential), located outside the electrode 74 in a concentric fashion, and having the same center as the electrode 74; and four quadrangular electrodes 76-79 (having both functions for connecting a ground potential and for applying voltage) are formed outside the electrode 75 and are 90 degrees apart from each other in a circle that has the same center as the ring-shaped electrode 74. These electrodes 74-79 are located without contacting each other. The quadrangular electrodes 76-79 are provided in a location with a certain size suitable for being contacted by a circumferential bottom surface (discussed later) of the conductive elastic body 62 of the location pointing driving body 60. The electrode 74 is provided for calibration. In other words, when the location pointing driving body 60 starts to operate, a pointing location is reset so that a new pointing location can be obtained through detecting an electrical potential at the next operation. The hole 74a at the center of the ring-shaped electrode 74 functions to prevent the spherical part 63 from continuously contacting the electrode 74. When the location pointing driving body 60 is assembled, the assembled location of the spherical part 63 may be lowered. In this case, because the spherical part 63 may contact the electrode 74, an electric current may continuously flow therebetween. Therefore, the hole 74a contributes to effectively prevent electric current from unnecessary flowing between the spherical part 63 and the electrode 74. The ring-shaped electrode 75 is provided in a location with a certain size suitable for being contacted by the spherical part 63 of the conductive elastic body 62 when the location pointing driving body 60 is pressed toward the PCB 70 and is moved within a plane of the PCB 70.

FIGS. 8A-8C are schematic views of the location pointing driving body 60 shown in FIG. 1. Specifically, FIG. 8A is a perspective view; FIG. 8B is a top plan view; and FIG. 8C is a bottom plan view.

A detailed structure of the location pointing driving body 60 is explained with reference to FIGS. 8A-8C. The location pointing driving body 60 is configured by connecting the lower part of the operation part 61 that has a nearly cylindrical shape with the conductive elastic body 62 in which its diameter is larger than that of the operation part 61. A first outer circumferential concave part 62a, which sags downwardly, is formed at the outer circumference of a connecting part between the operation part 61 and the conductive elastic body 62. An outer circumferential protrusion part 65, which protrudes to form an upward arch, is formed outside the first outer circumferential concave part 62a in the radial direction. A second outer circumferential concave part 66, which sags to the lower location than the first outer circumferential concave part 62a, is formed outside the outer circumferential protrusion part 65. An outer circumferential level plane part 67, which is formed at the slightly upper location relative to the second outer circumferential concave part 66 and then is formed as a level plane from that location, is formed outside the second outer circumferential concave part 66. Four of the concave parts 64 that are explained earlier are formed at the outer circumferential level plane part 67. A circumferential bottom surface 68 is formed at the location that corresponds to the lower part of the second outer circumferential concave part 66 and the outer circumferential level plane part 67 and in the back side of the conductive elastic body 62. The circumferential bottom surface 68 is divided into four parts by the concave parts 69 that are provided 90 degrees apart from each other and are extended in the radial direction from the concave parts 64 toward inside the conductive elastic body 62.

Figure 9A:
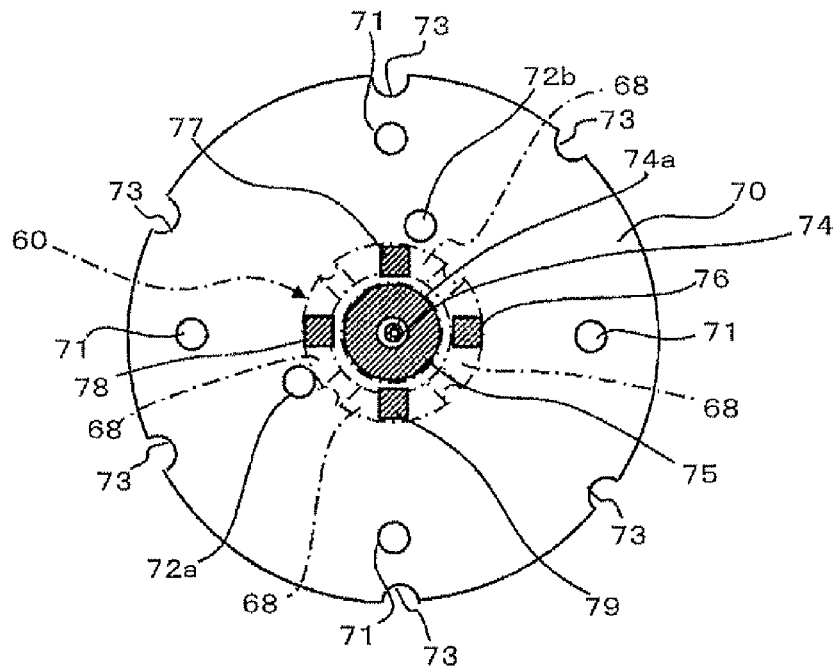
FIG. 9A is a top plan view for showing a state in which a location pointing driving body is provided at the electrode region of a PCB shown in FIG. 7.
Figure 9B:
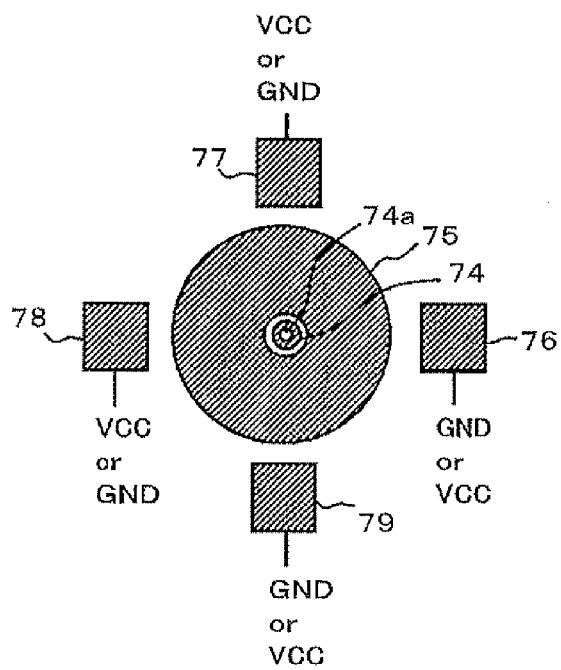
FIG. 9B is an enlarged top plan view of electrodes shown in FIG. 9A.
Figure 9C:
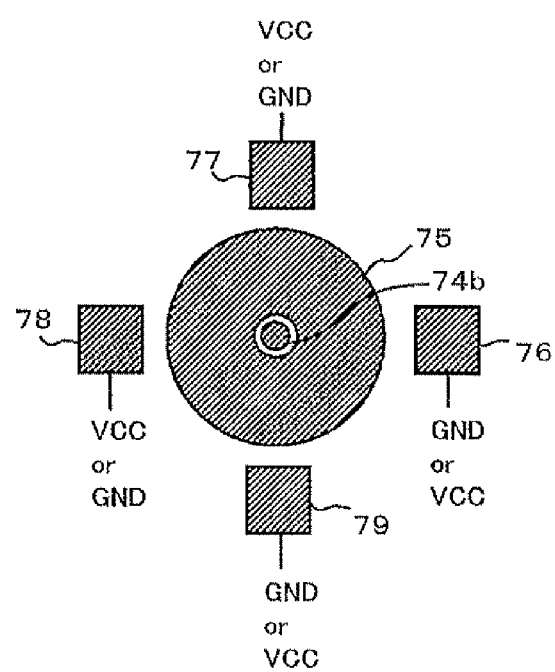
FIG. 9C is an enlarged top plan view for another example of electrodes shown in FIG. 9B.

FIG. 9A is a top plan view for showing a state in which the location pointing driving body 60 is provided at the electrode region of the PCB 70 shown in FIG. 7. FIG. 9B is an enlarged top plan view of electrodes shown in FIG. 9A. FIG. 9C is an enlarged top plan view for another example of electrodes shown in FIG. 9B.

In FIG. 9A, a bottom region of the location pointing driving body 60 is shown in alternating long and short dash lines. As shown in FIG. 9A, the circumferential bottom surface 68 of the location pointing driving body 60 is located to contact four of the quadrangular electrodes 76-79. In other words, the circumferential bottom surface 68 corresponds to a conductive part made of a conductive material that contacts the quadrangular electrodes 76-79 that have both functions for connecting a ground potential and for applying voltage. When the location pointing driving body 60 is not pressed toward the PCB 70, the ring-shaped electrodes 74 and 75 do not contact the spherical part 63 of the location pointing driving body 60. In this case, the spherical part 63 may contact only the hole 74a (corresponding to the upper surface of the PCB 70) at the center of the ring-shaped electrode 74.

As shown in FIG. 9B, with respect to the quadrangular electrodes 76-79 that are located on the upper surface of the PCB 70 shown in FIG. 9A, when VCC is applied to one of the two quadrangular electrodes 78 and 76 (or 77 and 79) that are located opposite each other through the ring-shaped electrode 75, a ground potential is applied to another of the two quadrangular electrodes 78 and 76 (or 77 and 79). There is the hole 74a (a part exposing the upper surface of the PCB 70) in a small circular shape at the center of the ring-shaped electrode 74. However, as shown in FIG. 9C, an electrode 74b without the hole 74a can be used. Further, the ring-shaped electrode 75 can be only the electrode for measuring an electrical potential without forming the ring-shaped electrode 74 and the circular electrode 74b.

Figure 10:
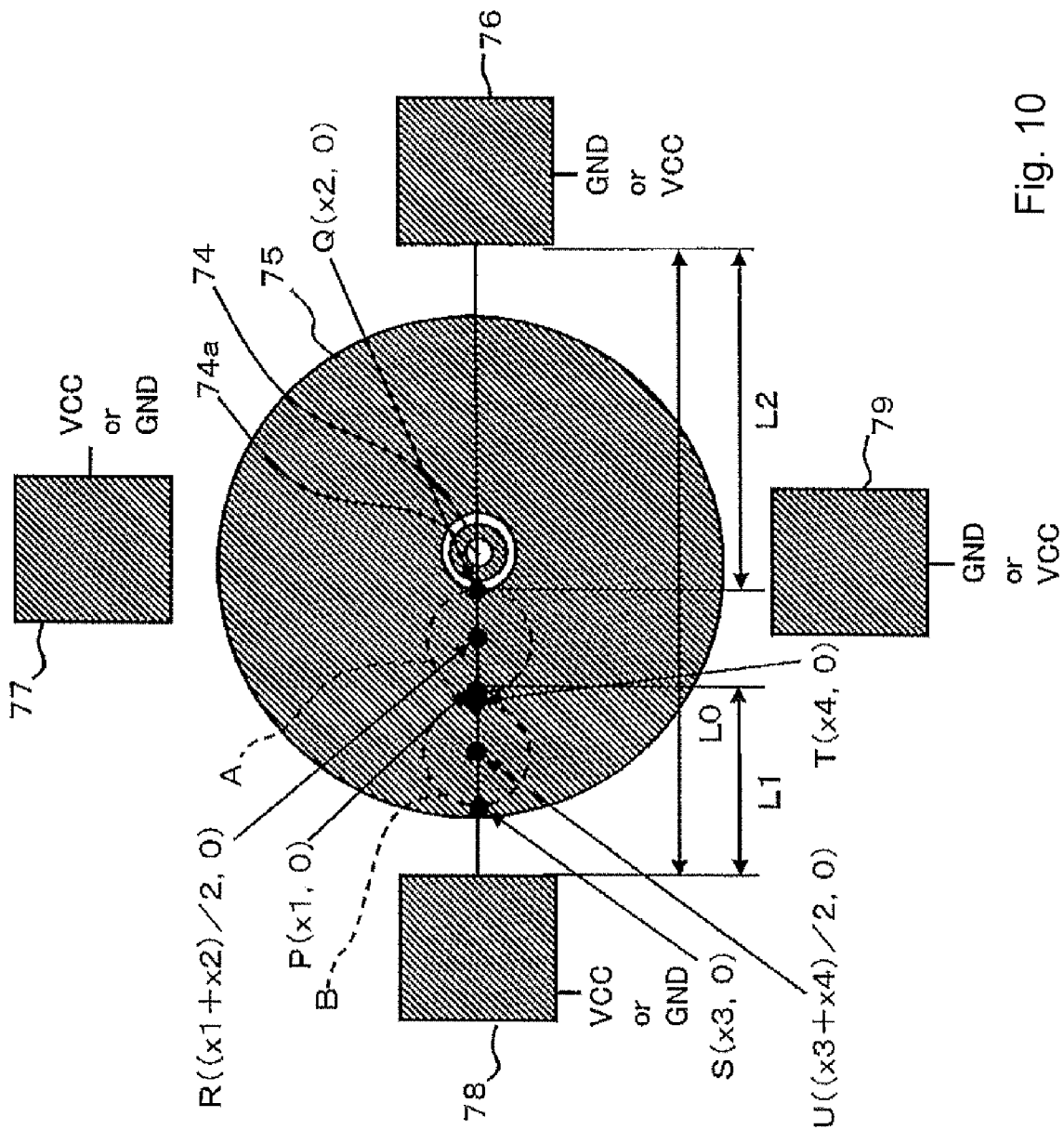
FIG. 10 is a schematic view for explaining a method for determining a pointing location when a spherical part of a location pointing driving body contacts an electrode for measuring an electrical potential.

FIG. 10 is a schematic view for explaining a method for determining a pointing location when the spherical part 63 of the location pointing driving body 60 contacts an electrode for measuring an electrical potential.

The ring-shaped electrode 75 connects to an electrical potential detection device (not shown) to detect an electrical potential at a short circuit location when a short circuit occurs through contacting by the spherical part 63. When the location pointing driving body 60 is not pressed toward the PCB 70, only the quadrangular electrodes 76-79 are electrically connected to the conductive elastic body 62. When the location pointing driving body 60 is pressed toward the PCB 70, first of all, the spherical part 63 is electrically connected to the ring-shaped electrode 74. At this time, a state is reset to the initial state through calibration. When the location pointing driving body 60 is further pressed toward the PCB 70 from this state, the spherical part 63 is also electrically connected to the ring-shaped electrode 75. Here, for example, VCC is applied to the quadrangular electrode 78, and the quadrangular electrode 76 that is opposite to the quadrangular electrode 78 is connected to a ground potential. At this time, with respect to the other quadrangular electrodes 77 and 79, their switches are open. Next, VCC is applied to the quadrangular electrode 79, and the quadrangular electrode 77 that is opposite to the quadrangular electrode 79 is connected to the ground potential. At this time, with respect to the other quadrangular electrodes 76 and 78, their switches are open. As discussed above, states of the quadrangular electrodes are sequentially changed among applying VCC, connecting the ground potential, and switches being open. The changeover is sequentially performed from one of the quadrangular electrodes in a clockwise or counterclockwise fashion. However, it is not necessary to perform the operation in a certain circular order. For example, the changeover may be performed in the following fashion: the quadrangular electrode 78, the quadrangular electrode 76, the quadrangular electrode 77, and the quadrangular electrode 79. An electric current flows from the quadrangular electrode in which VCC is applied to the ring-shaped electrode 75 through the spherical part 63 of the conductive elastic body 62 at each time of the changeover. When the actuator cap 10 is moved within the plane parallel to the plane of the PCB 70, the contact region between the spherical part 63 and the ring-shaped electrode 75 is variously changed. In FIG. 10, when the actuator cap 10 is simply moved in the left direction, the contact region between the spherical part 63 and the ring-shaped electrode 75 is shown. In FIG. 10, a region A shows the contact region when the actuator cap 10 is slightly moved in the left direction. Similarly, a region B shows the contact region when the actuator cap 10 is largely moved in the left direction.

A direction connecting the quadrangular electrode 78 and the quadrangular electrode 76 is defined as the X-axis. The distance between the quadrangular electrode 78 and the quadrangular electrode 76 is defined as L0. A point on the X-axis close to the quadrangular electrode 78 in the region A is defined as P (x1, 0). The distance between the quadrangular electrode 78 and the point P is defined as L1. Similarly, a point on the X-axis close to the quadrangular electrode 76 in the region A is defined as Q (x2, 0). The distance between the quadrangular electrode 76 and the point Q is defined as L2. An electric current from the quadrangular electrode 78 is shunted to the ring-shaped electrode 75 at the location of the point P. An electric current from the quadrangular electrode 76 is shunted to the ring-shaped electrode 75 at the location of the point Q. Because electrical resistance is proportional to the distance of conductive elastic body 62 through which an electric current flows, the electrical resistance is large by being proportional to the length of L1. As a result, the electrical resistance becomes a minimum value at the side edge part of the quadrangular electrode 78 in the ring-shaped electrode 75. Similarly, the electrical resistance becomes a maximum value at the side edge part of the quadrangular electrode 76 in the ring-shaped electrode 75. Therefore, coordinates of the point P (P(x1, 0)) can be obtained by detecting an electrical potential of the point P. Similarly, coordinates of the point Q (Q(x2, 0)) can be obtained by detecting an electrical potential of the point Q. When a center point R ((x1+x2)/2.0) between the point P (x1, 0) and the point Q (x2, 0) is defined as the X-axis of a location to which an operator points, a pointing location is determined by obtaining the point P (x1, 0) and the point Q (x2, 0) regardless of how the region A is changed. When a direction connecting the quadrangular electrode 77 and the quadrangular electrode 79 is defined as the Y-axis, coordinates on the Y-axis is determined in the same method. As a result, coordinates (X, Y) can be determined as coordinates of a pointing location.

When the actuator cap 10 is largely moved in the left direction, the spherical part 63 contacts the ring-shaped electrode 75 at a region B that is located the left side of the region A. The region B is a true circle or a circle in a manner similar to the region A. An area of the region B is similar to the region A. A point on the X-axis close to the quadrangular electrode 78 in the region B is defined as S (x3, 0). A point on the X-axis close to the quadrangular electrode 76 in the region B is defined as T (x4, 0). In this situation discussed above, a center point U ((x3+x4)/2.0) between the point S (x3, 0) and the point T (x4, 0) is on the left side to the center point R ((x1+x2)/2.0) of the region A.

In this case, even though the actuator cap 10 is operated in any directions, pressing force to the location pointing driving body 60 is not mostly changed. In this embodiment, after the spherical part 63 contacts the ring-shaped electrodes 74 and the ring-shaped electrode 75, the slide member 30 shown in FIG. 4 contacts the ring sheet 40. After that, the pressing force toward the lower part is restricted. In other words, the ring sheet 40 and the clamp ring 50 that are provided below the ring sheet 40, which are in the outside of the location pointing driving body 60, correspond to a pressing force restriction member that restricts the pressing force from the spherical part 63 to the PCB 70 by receiving force from the slide member 30 in the pressing direction after the spherical part 63 of the location pointing driving body 60 contacts the ring-shaped electrodes 74 and the ring-shaped electrode 75. As a result, a region in which the spherical part 63 of the location pointing driving body 60 contacts the ring-shaped electrode 75 is nearly a true circle or a circle and nearly isometric regardless of the direction within a movable area of the spherical part 63. In addition, even though the spherical part 63 is moved in any manner, the spherical part 63 is not excessively deformed. Therefore, areas of the regions A and B are smaller compared with the conventional ones. As a result, since the risk, i.e. the spherical part 63 is out of a detectable region of the ring-shaped electrode 75, can be decreased, it is difficult for pointing errors for detecting a pointing location to occur.

Figure 11:
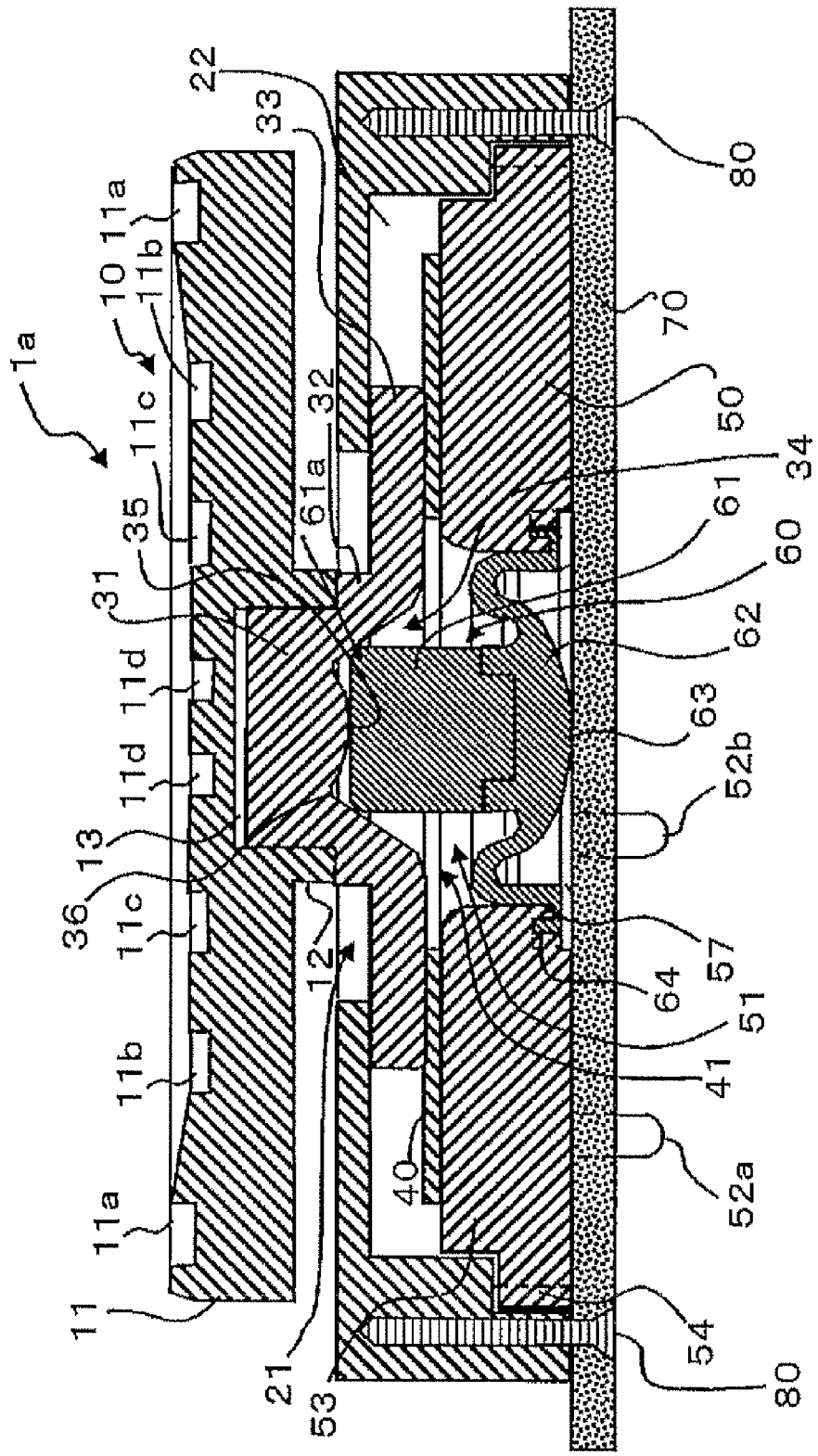
FIG. 11 is a sectional view for another exemplary configuration of a pointing device according to a first embodiment.

FIG. 11 is a sectional view for another exemplary configuration of a pointing device according to the first embodiment.

A pointing device 1a shown in FIG. 11 is different from the pointing device 1 shown in FIG. 4 as follows: in the state in which the actuator cap 10 is not operated, the slide member 30 contacts the ring sheet 40; the gap t1 does not exist; the spherical part 63 of the location pointing driving body 60 contacts the upper surface (accurately, both the ring-shaped electrode 74 and the ring-shaped electrode 75) of the PCB 70; and the gap t2 does not exist. Structures other than the above are the same as the pointing device 1 discussed earlier.

In the pointing device 1a, when the actuator cap 10 is not operated, the location pointing driving body 60 is already pressed downwardly. Therefore, when the actuator cap 10 is operated, further pressing is not performed. Further uniformity is easily obtained in the contact area between the spherical part 63 and the ring-shaped electrode 75. In this case, when the operation is not performed, an electric current flows between the quadrangular electrode to which VCC is applied the quadrangular electrodes 76-79 and the ring-shaped electrode 74. However, the present embodiment is not limited to this structure. For example, the amount of pressing can be adjusted to a small degree so as to make the spherical part 63 to contact the hole 74a at the center of the ring-shaped electrode 74 and not to contact the ring-shaped electrode 74. In view of reducing power consumption in a standby condition, it is advantageous that the spherical part 63 does not contact the ring-shaped electrode 74. When electrical power saving is not considered, the ring-shaped electrode 74 is formed without the hole 74a as a circular electrode 74b as shown in FIG. 9C.

2. Second Embodiment

Figure 12:
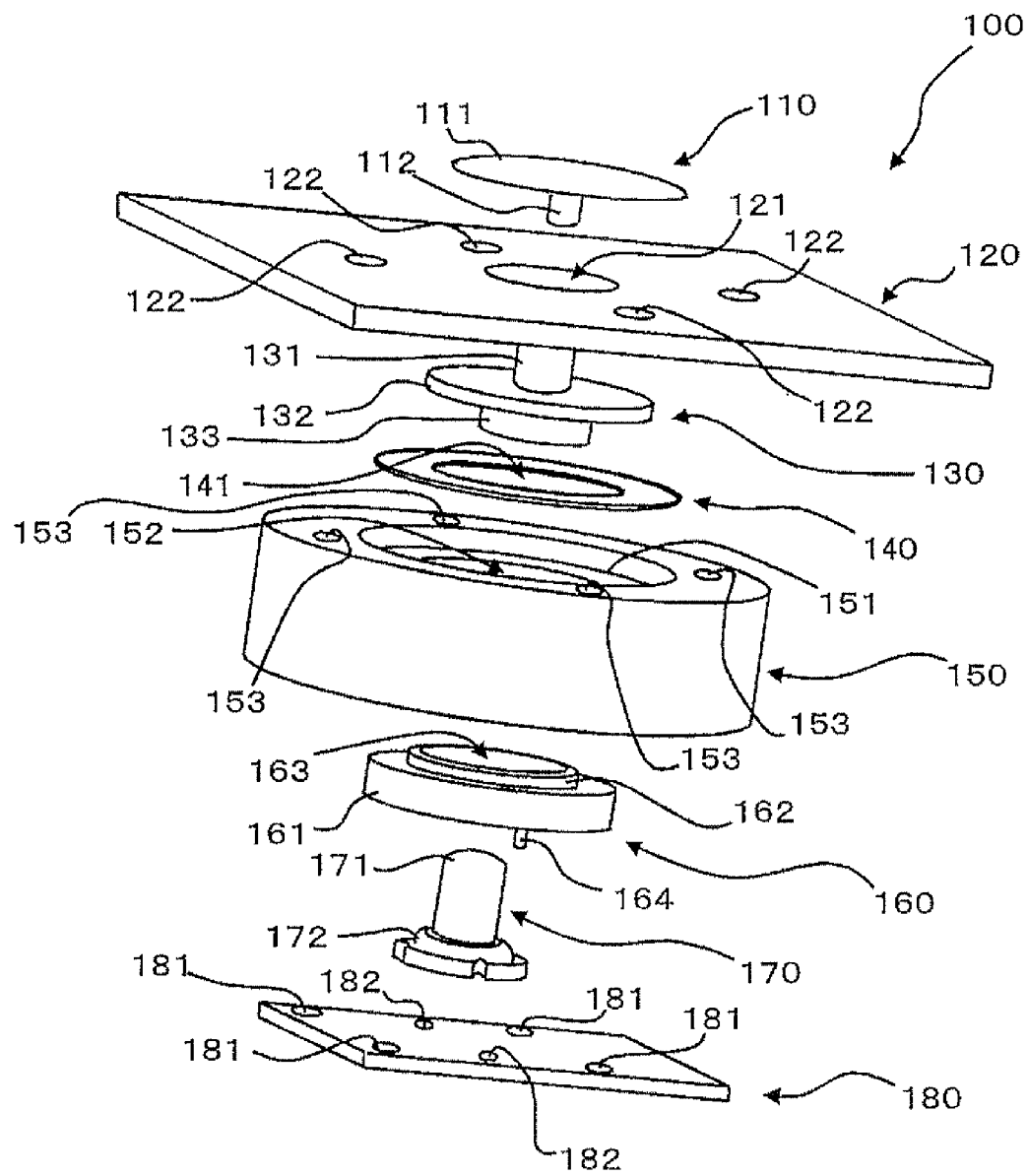
FIG. 12 is an exploded perspective view of a pointing device according to a second embodiment.
Figure 13:
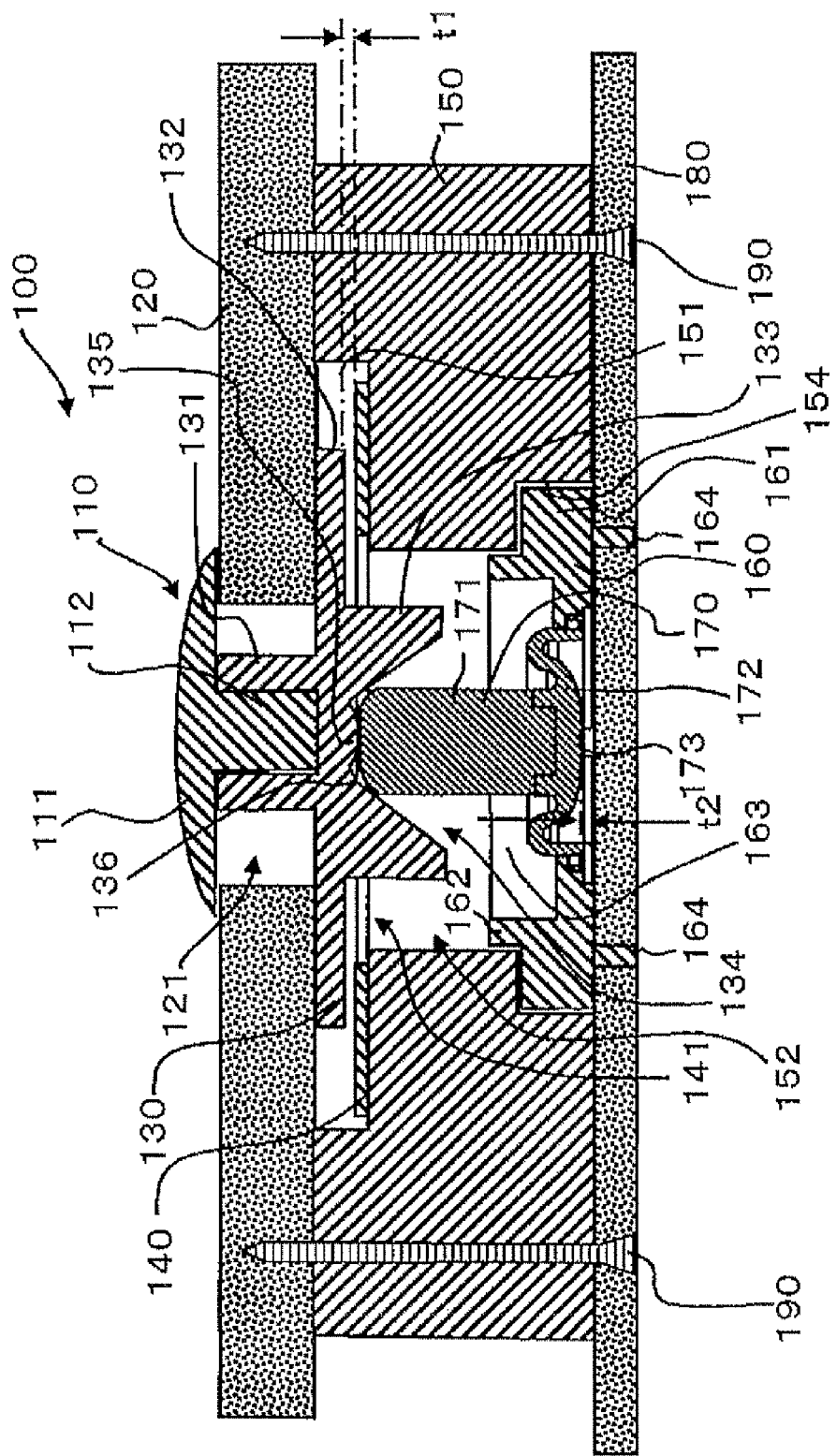
FIG. 13 is a sectional view of a pointing device shown in FIG. 12 taken along the same line as line A-A for a pointing device shown in FIG. 2.

FIG. 12 is an exploded perspective view of a pointing device according to a second embodiment. FIG. 13 is a sectional view of a pointing device shown in FIG. 12 taken along the same line as line A-A for a pointing device shown in FIG. 2. In the same manner as the first embodiment, hereinafter, each direction for up, down, right, and left is defined as an upper direction, a down direction, a right direction, and a left direction in FIG. 13, respectively.

A pointing device 100 according to the second embodiment is configured with a combination of an actuator cap 110, a case plate 120, a slide member 130, a ring sheet 140, a housing 150, a clamp ring 160, a location pointing driving body 170, and a PCB 180 in order from top to bottom.

The actuator cap 110 is made of resin and has a configuration in which a cylindrical body 112 that has a sufficiently smaller diameter than that of an operation plate 111 is jointed at a bottom surface of the operation plate 111 that gently protrudes upwardly in a convex and a circular shape.

The case plate 120 is flat plate that is made of resin. A through hole 121 that has a sufficiently larger diameter than an outer diameter of the cylindrical body 112 is formed in the case plate 120. Four of the screw holes 122 that are for fixing with the housing 150 discussed later are provided 90 degrees apart from each other in a circle that has the same center as the through hole 121 in the outside of the through hole 121.

The slide member 130 is made of resin and is configured with a cylindrical part 131 that has a slightly larger inner diameter than an outer diameter of the cylindrical body 112 and has the opening part at its upper part, a circular plate 132 that has a sufficiently larger diameter than that of the cylindrical part 131, and a cylindrical part 133 that has a smaller diameter than an outer diameter of the circular plate 132, has a larger diameter than an outer diameter of the cylindrical part 131 and has the opening part at its lower part. These structures 131-133 are jointed together in order from top to bottom so as to form each of the centers of those aligned structures. The outer diameter of the cylindrical part 131 is sufficiently smaller than a diameter of the through hole 121 of the case plate 120. As shown in FIG. 13, a concave part 134 is formed from the lower opening part of the cylindrical part 133 toward the upper part. The concave part 134 has a similar shape as the concave part 34 of the slide member 30 that is one structural part of the pointing device 1 according to the first embodiment. On the upper surface of the concave part 134, a convex part 135, which protrudes downwardly from the nearly center of the upper surface, and an outer circumferential concave part 136, which sags upwardly in the outer circumference of a circle that has the same center as the convex part 135, are formed.

It is preferred that the ring sheet 140 is a thin sheet in a ring shape and is made of a fluorine system resin, such as polytetrafluoroethylene (PTFE). A circular through hole 141 is formed at the center of the ring sheet 140. A diameter of the through hole 141 is sufficiently larger than an outer diameter of the cylindrical part 133 of the slide member 130 and is smaller than an outer diameter of the circular plate 132.

The housing 150 is made of resin and has a nearly annular ring shape. A circular concave part 151 sagging downwardly is formed at the center of the upper surface side of the housing 150. A through hole 152 that is continued from the concave part 151, that passes through the housing 150 in upper and lower directions, and that has a smaller diameter than that of the concave part 151 is formed. The diameter of the concave part 151 is larger than an outer diameter of the ring sheet 140. The ring sheet 140 is simply provided at the lower surface of the concave part 151. Alternatively, the ring sheet 140 is adhered to the lower surface of the concave part 151 through, for example, a bond or glue. A diameter of the through hole 152 is slightly smaller than that of the through hole 141 of the ring sheet 140 and is sufficiently larger than that of cylindrical part 133 of the slide member 130. Four screw holes 153 are formed 90 degrees apart from each other in a circle that has the same center as the concave part 151 on the edge surface in the outer circumferential side of the concave part 151 of the housing 150. Four of the screw holes 153 are formed so as to pass through the housing 150 in upper and lower directions. As shown in FIG. 13, a concave part 154 sagging upwardly is formed at the center in the lower surface side of the housing 150. A diameter of the concave part 154 is larger than that of the through hole 152. Therefore, the concave part 151, the through hole 152 that has a smaller diameter than that of the concave part 151, and the concave part 154 that has a larger diameter than that of the through hole 152 are continuously formed at the center of the housing 150 in order from top to bottom.

The clamp ring 160 is made of resin and is configured by fixing a ring part 162 with a relatively small outer diameter on a ring part 161 with a relatively large outer diameter. The outer diameter of the ring part 162 is slightly smaller than an diameter of the through hole 152 of the housing 150. The outer diameter of the ring part 161 is slightly smaller than a diameter of the concave part 154 of the housing 150. After the upper ring part 162 is inserted into the through hole 152 of the housing 150, and after the lower ring part 161 is fitted in the concave part 154 of the housing 150, the clamp ring 160 can be attached to the housing 150. A through hole 163 that passes through the clamp ring 160 in upper and lower directions is formed at the center of the clamp ring 160. As shown in FIG. 13, the through hole 163 has difference in level at the inner surface so as to have a smaller diameter near the lower surface of the clamp ring 160. Two cylindrical fixing members 164 protruding downwardly are formed outside the through hole 163 at the lower surface of the clamp ring 160.

The location pointing driving body 170 has a nearly convex shape (nearly hat shape), as shown in FIG. 12, and is configured by connecting an operation part 171 that is made of resin and has a nearly cylindrical shape with a conductive elastic body 172 with a thin nearly dome shape. The conductive elastic body 172 has a spherical part 173 at its lower center. The spherical part 173 gently forms into a downward arch. The location pointing driving body 170 is similar to the location pointing driving body 60 that is one structural part of the pointing device 1 according to the first embodiment. They have common structures except an operation part 171. The operation part 171 of the location pointing driving body 170 is vertically longer than the operation part 61 of the location pointing driving body 60. Therefore, detailed explanations for structures of the location pointing driving body 170 are omitted. An outer diameter of the operation part 171 of the location pointing driving body 170 is sufficiently smaller than a diameter at the upper side of the through hole 163 of the clamp ring 160. When the location pointing driving body 170 is inserted from the lower part of the clamp ring 160 and is set, an outer circumferential part of the conductive elastic body 172 is fixed by the difference in level at the lower surface of the clamp ring 160 so as to prevent the conductive elastic body 172 from moving upwardly and rotating.

The PCB 180 has four screw holes 181 that correspond to the screw holes 153 of the housing 150 and the screw holes 122 of the case plate 120. As shown in FIG. 13, screws 190 are screwed in order from the lower side of the PCB through the screw holes 181, 153, and 122. The PCB 180 also has two through holes 182 in which the two fixing members 164 protruding downwardly from the lower surface of the clamp ring 160 can be inserted. However, alternatively, when a thickness of the PCB 180 is larger than a length of the fixing member 164, a concave part that does not pass through the PCB 180 downwardly may be formed in place of the through hole 182. The PCB 180 has also electrodes that are the same as a plurality of the electrodes 74-79 that are formed at the upper surface of the PCB 70 and are structural members of the pointing device 1 according to the first embodiment.

When the above mentioned parts, the actuator cap 110, the case plate 120, the slide member 130, the ring sheet 140, the housing 150, the clamp ring 160, the location pointing driving body 170, and the PCB 180, are assembled in order, a top part of the operation part 171 of the location pointing driving body 170 is covered by the concave part 134 of the slide member 190. As a result, a gap t1 (for example, t1=0.1 mm) is formed between the lower surface of the circular plate 132 of the slide member 130 and the upper surface of the ring sheet 140, and a gap t2 (for example, t2=0.1 mm) is formed between the spherical part 173 of the location pointing driving body 170 and the upper surface of the PCB 180. When the actuator cap 110 is freely operated within a plane parallel to the PCB 180, the housing 150, the clamp ring 160 and the location pointing driving body 170 do not rotate with respect to the PCB 180 so that the slide member 130 is driven in accordance with movement of the actuator cap 110. The concave part 134 in the back side of the slide member 130 covers the top part of the operation part 171. Therefore, when the slide member 130 is driven, the operation part 171 is also driven. Because the gaps t1 and t2 exist, the actuator cap 110 is required to be pressed downwardly until the spherical part 173 contacts both the ring-shaped electrodes 74 and 75 on the PCB 180. When the spherical part 173 contacts both the electrodes 74 and 75, the circular plate 132 of the slide member 130 contacts the ring sheet 140 so that the gap t1 disappears. Therefore, further downward pressing is not possible. In other words, the ring sheet 140 and the housing 150 that is provided below the ring sheet 140, which are in the outside of the location pointing driving body 170, correspond to a pressing force restriction member that restricts the pressing force from the spherical part 173 to the PCB 180 by receiving force from the slide member 130 in the pressing direction after the spherical part 173 of the location pointing driving body 170 contacts the ring-shaped electrodes 75. Because the conductive elastic body 172 that is connected to the lower part of the operation part 171 can be flexibly deformed, the spherical part 173 that is located at the lower part of the operation part 171 is freely moved within a region of a plurality of the electrodes formed on the upper surface of the PCB 180. It is ideal that the gap t1 is equal to the gap t2 (t1=t2) in the same manner as the first embodiment. However, the gap t1 may be larger than the gap t2 (t1>t2) or can be smaller than the gap t2 (t1<t2).

Figure 14:
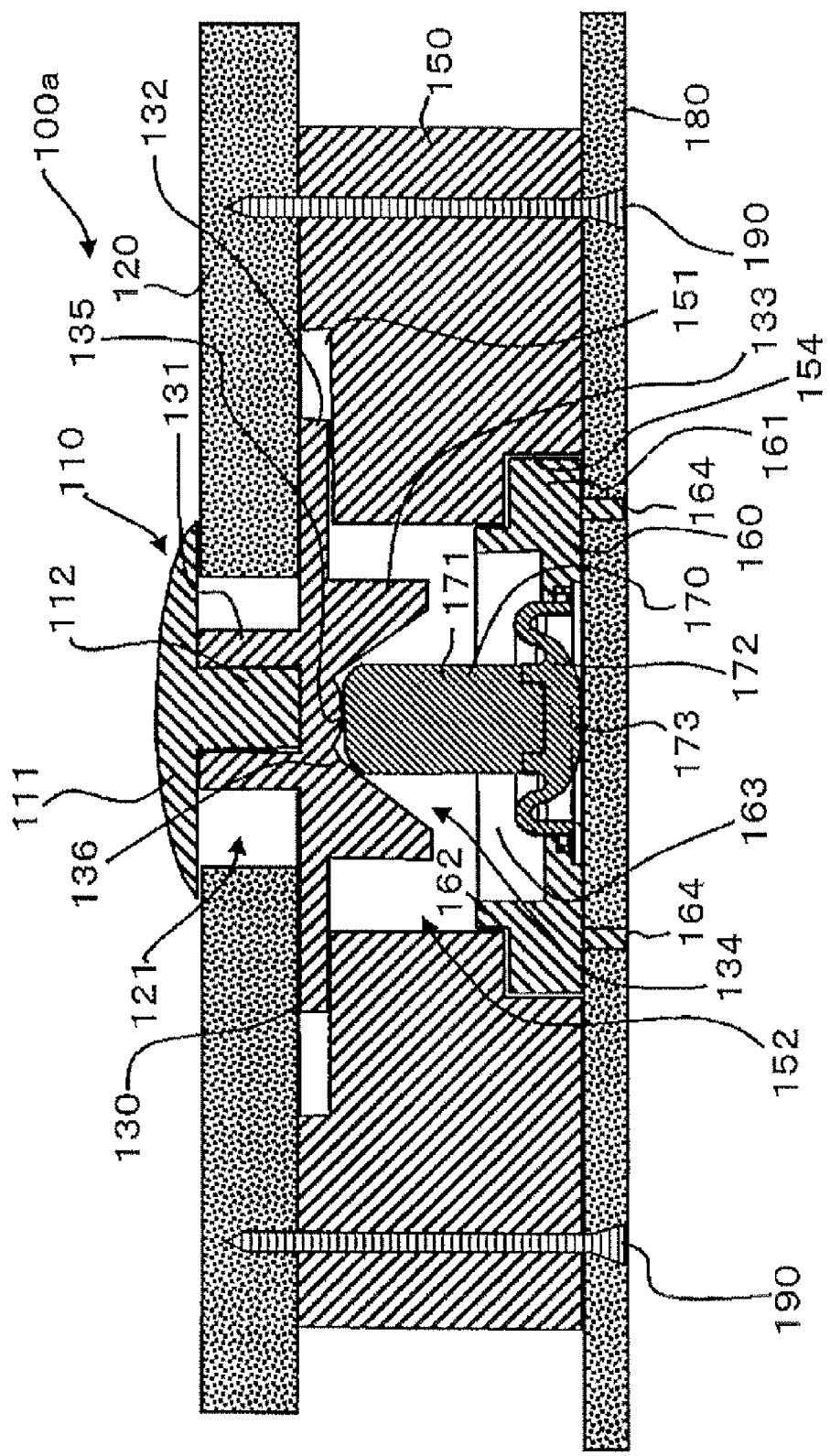
FIG. 14 is a sectional view for another exemplary configuration of a pointing device according to a second embodiment.

FIG. 14 is a sectional view for another exemplary configuration of a pointing device according to a second embodiment.

A pointing device 100a shown in FIG. 14 is different from the pointing device 100 shown in FIG. 13 as follows: in the state in which the actuator cap 110 is not operated, the slide member 130 contacts the ring sheet 140; the gap t1 does not exist; the spherical part 173 of the location pointing driving body 170 contacts the upper surface (accurately, both the ring-shaped electrode 74 and the ring-shaped electrode 75) of the PCB 180; and the gap t2 does not exist. Structures other than the above differences are the same as the pointing device 100 discussed earlier.

In the pointing device 100a, when the actuator cap 110 is not operated, the location pointing driving body 170 is already pressed downwardly. Therefore, further uniformity is easily obtained in the contact area between the spherical part 173 and the ring-shaped electrode 75 in the same manner as the pointing device 1a discussed earlier. In this case, when the operation is not performed, an electric current flows between the quadrangular electrodes 76-79 and the ring-shaped electrode 74. However, the present embodiment is not limited to this structure. For example, the amount of pressing can be adjusted to a small degree so as to make the spherical part 173 contact the hole 74a at the center of the ring-shaped electrode 74 and not to contact the ring-shaped electrode 74. In this case, power consumption in a standby condition can be reduced.

Preferred embodiments of a pointing device according to the present application are explained. However, the embodiments are not limited to these structures. It will be apparent that the same may be varied in many ways.

Figure 15:
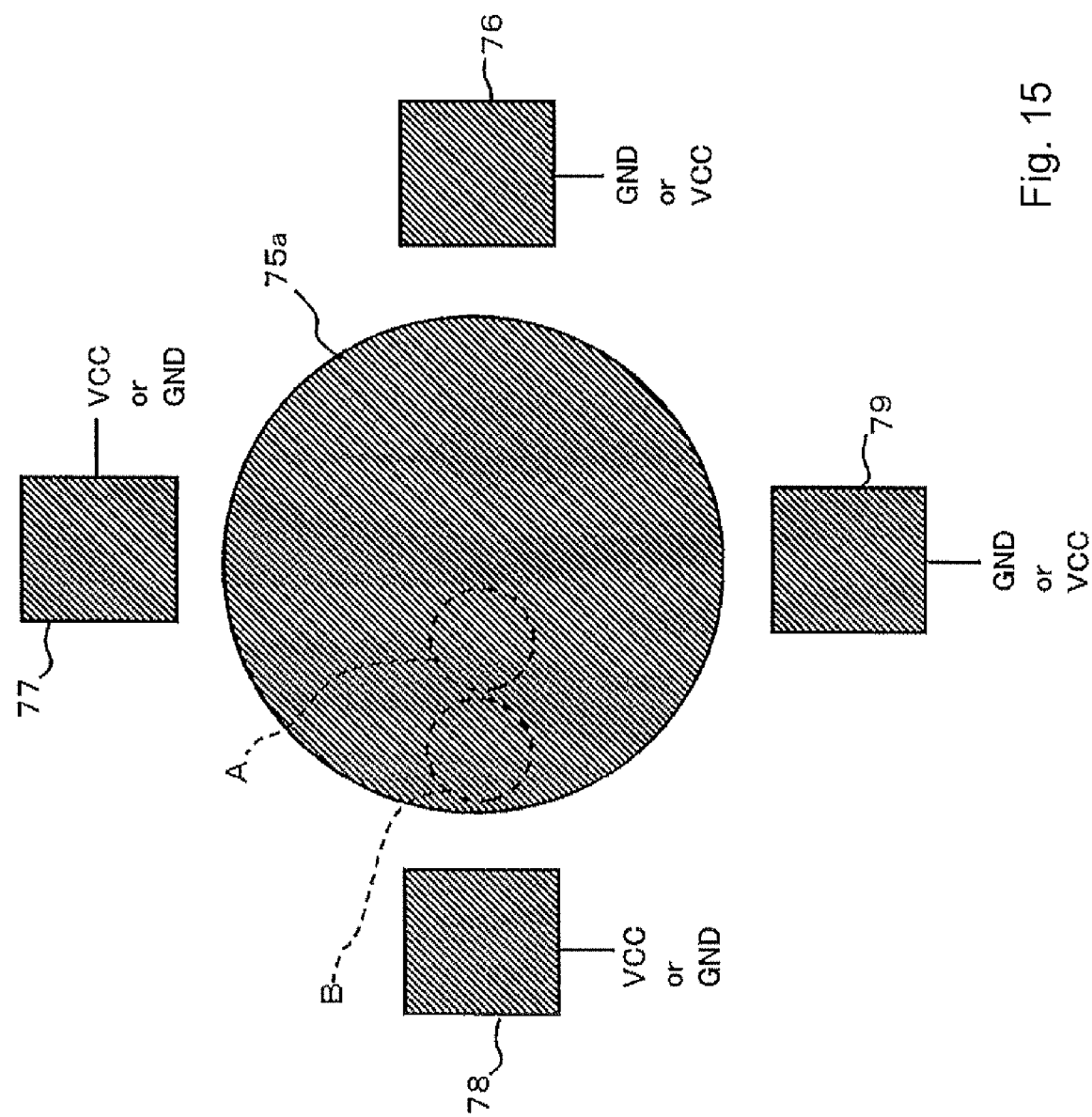
FIG. 15 is a top plan view for another example of electrodes that are different from those shown in FIGS. 9B and 9C.
Figure 16:
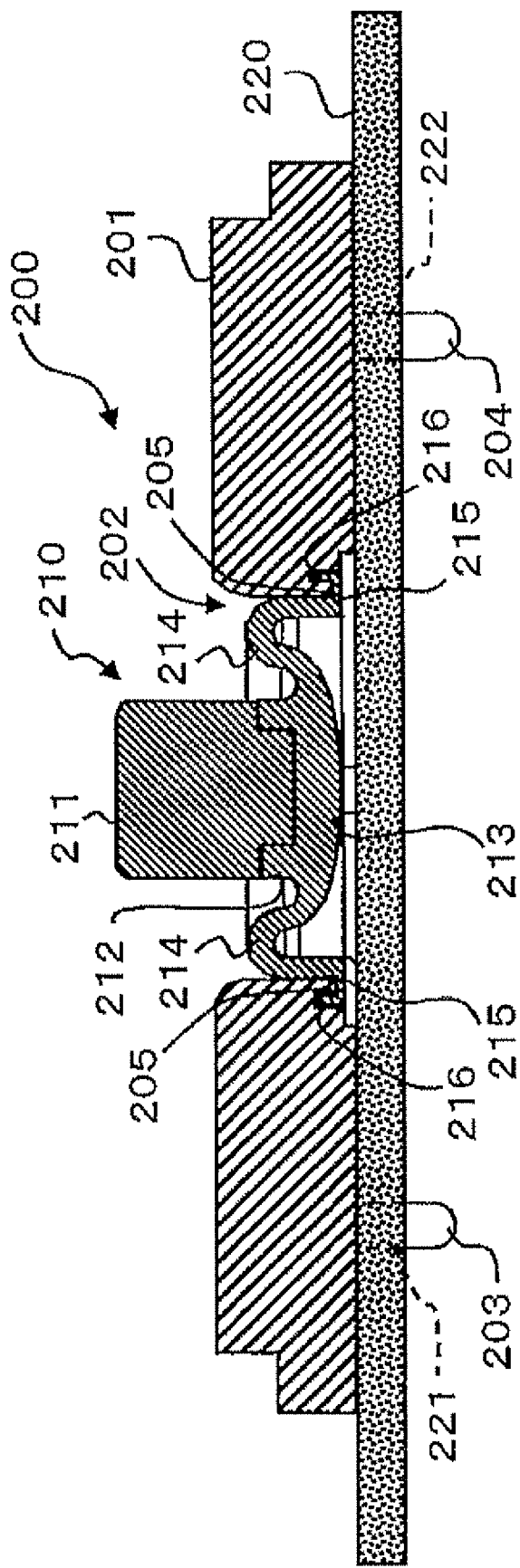
FIG. 16 is a schematic sectional view of a conventional pointing device in which a conductive elastic body is used as an operating device.
Figure 17:
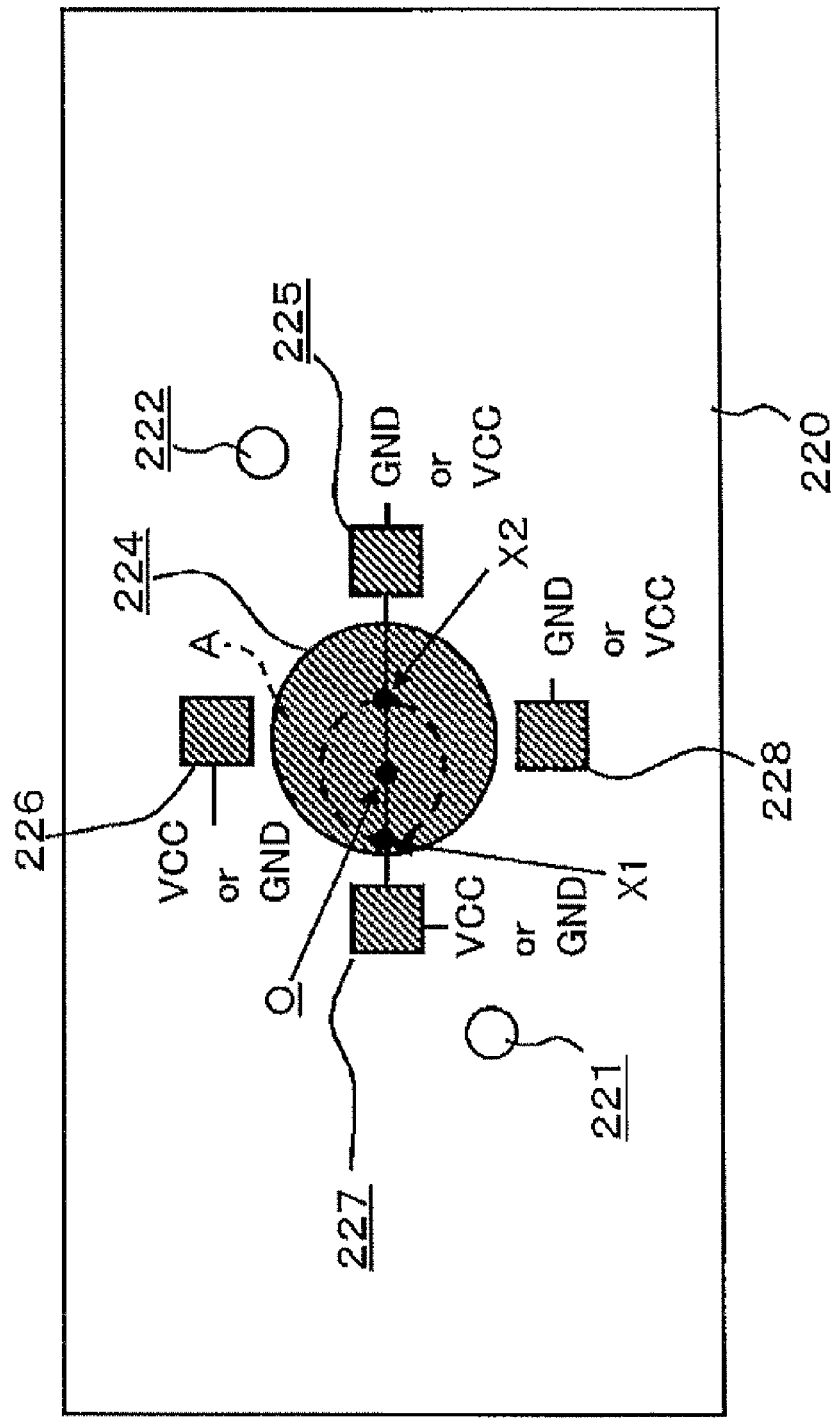
FIG. 17 is a top plan view of a PCB that is located as a lowermost layer of a conventional pointing device shown in FIG. 16.
Figure 18:
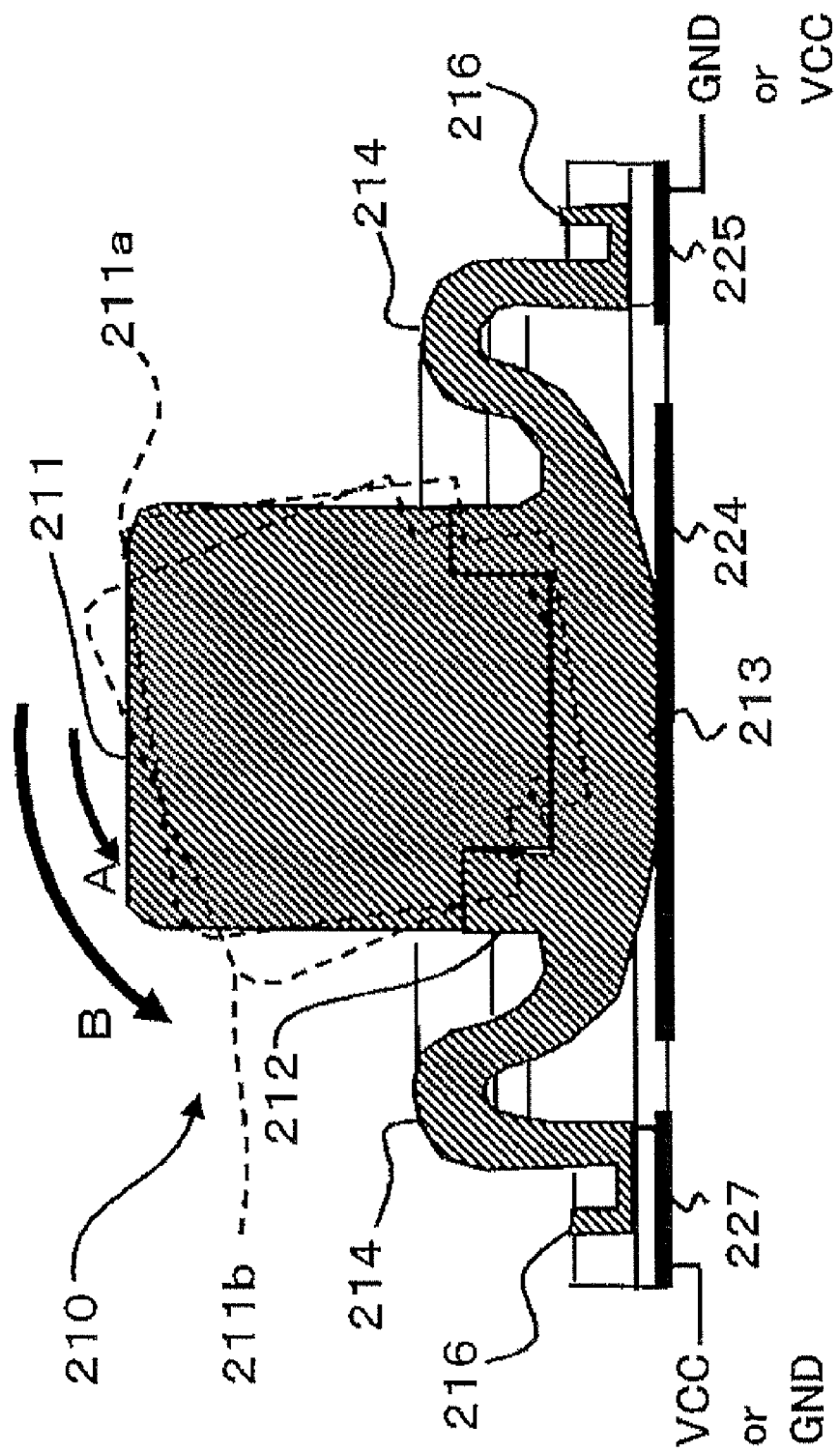
FIG. 18 is a sectional view for showing situations in which two types of operations are performed by tilting a conductive elastic body in one direction in a conventional pointing device shown in FIG. 16.
Figure 19:
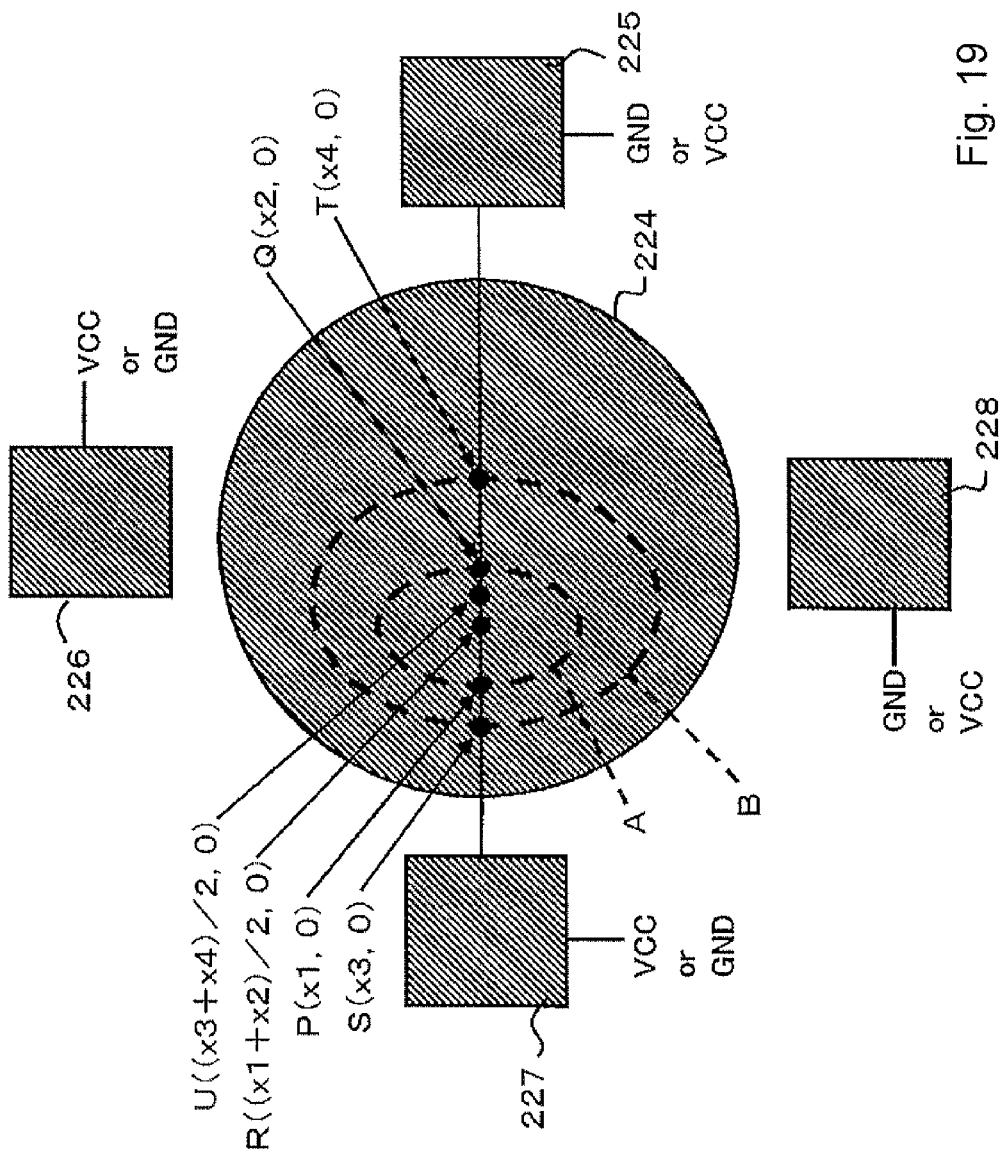
FIG. 19 is a schematic view for explaining a method for obtaining a coordinate of a pointing location according to each region in which a lower surface of a conductive elastic body contacts an electrode of a PCB at the time of performing two types of operations shown in FIG. 18.

For example, as shown in FIG. 15, an electrode that is for measuring an electrical potential among a plurality of electrodes located on the PCB may be formed as one circular electrode 75a rather than the ring-shaped electrode 75 (including one that has the ring-shaped electrode 74 inside the ring of the electrode 75). When the circular electrode 75a is adopted, the spherical part 63 (or the spherical part 173) can contact the circular electrode 75a through the nearly circular region such as the regions A and B. Although not shown, however, electrodes for the ground potential and for applying voltage can be formed in, for example, a circular shape rather than the quadrangular electrodes 76-79.

In each of the embodiments discussed above, the downward pressing force from the actuator cap 10, 110 is applied to the ring sheet 40, 140 and the clamp ring 50 or the housing 150, which is below the ring sheet 40, 140, after the spherical part 63, 173 contacts the upper surface of the PCB 70, 180. It is restricted so that the pressing force is not applied to the location pointing driving body 60, 170. However, when the upper surface of the housing is tightly sandwiched by the actuator cap 10 and the slide member 30, or when the case plate 120 is tightly sandwiched by the actuator cap 110 and the circular plate 132 of the slide member 130, the downward pressing force from the actuator cap 10, 110 can be received by the housing 20 or the case plate 120. When the structures discussed above are adopted, the pressing force is not applied to the location pointing driving body 60, 170 without adopting the structures in which the ring sheet 40, 140 and the clamp ring 50 or the housing 150, which is below the ring sheet 40, 140, receive the pressing force from above.

The ring-shaped electrode 75 is not limited to one ring-shaped electrode. For example, a plurality of electrodes may be arranged in the ring shape so as to form the ring-shaped electrode 75. The ring sheet 40, 140 is not an essential structure. So long as the slide member 30, 130 can freely slide within a plane parallel to a plane of the PCB 70, 180, existence or nonexistence of the ring sheet 40, 140 does not matter. The PCB 70, 180 is not an essential structure for the pointing device 1, 1a, 100, 100a. The pointing device 1, 1a, 100, 100a may be manufactured without attaching the PCB 70, 180. Then, the PCB 70, 180 may be supplied after the pointing device 1, 1a, 100, 100a is manufactured. The outer circumferential concave part 36, 136 that is formed at the concave part 34, 134 of the slide member 30, 130 is not an essential structure. So long as movement of the operation part 61, 171 is not interrupted by its shape in accordance with shapes of the top part of the operation part 61, 171, existence or nonexistence of the outer circumferential concave part 36, 136 does not matter. So long as the clamp ring 50 or the housing 150 is the pressing force restriction member, the actuator cap 10, 110 is not an essential structure. In this case, the upper part of the slide member 30, 130 is extended upwardly. Then, the extended tip of the slide member 30, 130 may be operated as an actuator.

The pointing device being thus described, it will be apparent that the same may be varied in many ways. Such variations are not to be regarded as a departure from the sprit and scope of the invention, and all such modifications as would be apparent to one of ordinary skill in the art are intended to be included within the scope of the following claims.

What is claimed is:

1. A pointing device comprising:
a first ground potential electrode;
a second electrode for applying a voltage;
a third electrode for measuring an electrical potential that is located between the first and second electrodes;
a fourth electrode for calibration that is spaced apart from the third electrode;
a printed circuit board on which the first electrode, the second electrode and the third electrode are provided;
a location pointing driving body that is provided on the printed circuit board and that is configured with a conductive part that is made of a conductive material and that contacts the first and second electrodes, and a spherical part protruding downwardly above the third electrode;
a slide member that is located to cover a top part of the location pointing driving body and that is configured to drive the location pointing driving body by being slidable within a plane parallel to the printed circuit board; and
a pressing force restriction member that is located outside the location pointing driving body and that is configured to restrict pressing force from the spherical part to the printed circuit board by receiving force from the slide member in the pressing direction after the spherical part of the location pointing driving body contacts the third electrode, wherein
when the location pointing driving body is in a non-operation state, the spherical part is spaced apart from the third electrode,
a gap is defined between the slide member and the pressing force restriction member for applying the pressing force to the location pointing driving body until the spherical part contacts the third electrode,
the third electrode is in a ring shape so that a hole is formed at the center of the third electrode, and
the fourth electrode is provided within the hole.

2. The pointing device according to claim 1, wherein
an inner bottom surface of a concave part that covers the top part of the location pointing driving body in the slide member from above has an outer circumferential concave part at an inner bottom corner that sags from the center of the inner bottom upper surface, and
when the slide member is slid, the outer circumferential concave part is configured to enable the top part of the location pointing driving body to move smoothly.

3. The pointing device according to claim 1, wherein
the fourth electrode is in a ring shape.

4. A pointing device comprising:
a first ground potential electrode;
a second electrode for applying a voltage;
a third electrode for measuring an electrical potential that is located between the first and second electrodes;
a fourth electrode for calibration that is spaced apart from the third electrode;
a printed circuit board on which the first electrode, the second electrode and the third electrode are provided;
a location pointing driving body that is provided on the printed circuit board and that is configured with a conductive part that is made of a conductive material and that contacts the first and second electrodes, and a spherical part protruding downwardly above the third electrode;
a slide member that is located to cover a top part of the location pointing driving body and that is configured to drive the location pointing driving body by being slidable within a plane parallel to the printed circuit board; and a pressing force restriction member that is located outside the location pointing driving body and that is configured to restrict pressing force from the spherical part to the printed circuit board by receiving force from the slide member in the pressing direction after the spherical part of the location pointing driving body contacts the third electrode, wherein the third electrode is in a ring shape so that a hole is formed at the center of the third electrode, and the fourth electrode is provided within the hole.

5. The pointing device according to claim 4, wherein an inner bottom surface of a concave part that covers the top part of the location pointing driving body in the slide member from above has an outer circumferential concave part at an inner bottom corner that sags from the center of the inner bottom upper surface, and when the slide member is slid, the outer circumferential concave part is configured to enable the top part of the location pointing driving body to move smoothly.

6. The pointing device according to claim 4, wherein the fourth electrode is in a ring shape.

7. The pointing device according to claim 6, wherein an inner bottom surface of a concave part that covers the top part of the location pointing driving body in the slide member from above has an outer circumferential concave part at an inner bottom corner that sags from the center of the inner bottom upper surface, and when the slide member is slid, the outer circumferential concave part is configured to enable the top part of the location pointing driving body to move smoothly.

* * * * *